United States Patent [19]
Umeda et al.

[11] Patent Number: 5,568,472
[45] Date of Patent: Oct. 22, 1996

[54] CODE DIVISION MULTIPLE ACCESS MOBILE COMMUNICATION SYSTEM

[75] Inventors: Narumi Umeda, Yokohama; Tadashi Matsumoto; Youichi Douzono, both of Yokosuka, all of Japan

[73] Assignee: NTT Mobile Communications Network Inc., Tokyo, Japan

[21] Appl. No.: 256,230
[22] PCT Filed: Nov. 4, 1993
[86] PCT No.: PCT/JP93/01592
  § 371 Date: Jun. 29, 1994
  § 102(e) Date: Jun. 29, 1994
[87] PCT Pub. No.: WO94/10766
  PCT Pub. Date: May 11, 1994

[30] Foreign Application Priority Data

Nov. 4, 1992 [JP] Japan .................................... 4-295340
Nov. 20, 1992 [JP] Japan .................................... 4-312280
Dec. 24, 1992 [JP] Japan .................................... 4-344740
Dec. 24, 1992 [JP] Japan .................................... 4-344741

[51] Int. Cl.[6] ................................................ H04J 13/04
[52] U.S. Cl. ....................................... 370/18; 370/95.1
[58] Field of Search ............................. 370/18, 95.1, 95.3, 370/19; 375/200, 201, 205, 206; 455/56.1

[56] References Cited

U.S. PATENT DOCUMENTS

| | | | |
|---|---|---|---|
| 4,222,115 | 9/1980 | Cooper et al. | 375/200 |
| 4,549,303 | 10/1985 | Gutleber | 375/343 |
| 4,930,140 | 5/1990 | Cripps et al. | 375/205 |
| 5,101,406 | 3/1992 | Messenger | 370/95.1 |
| 5,109,390 | 4/1992 | Gilhousen et al. | 370/18 |
| 5,170,412 | 12/1992 | Massey | 375/206 |

FOREIGN PATENT DOCUMENTS 58-56290 12/1983 Japan .
92/17989 10/1992 WIPO .

OTHER PUBLICATIONS

Ruprecht, J., et al., "Code Time Division Multiple Access: An Indoor Cellular System", *Vehicular Technology Society, 42nd VTS Conference Frontiers of Technology*, vol. 2, May 1992, pp. 736–739.

Primary Examiner—Douglas W. Olms
Assistant Examiner—Min Jung
Attorney, Agent, or Firm—Pollock, Vande Sande & Priddy

[57] ABSTRACT

In a mobile communication system which uses a code division multiple access (CDMA) scheme for communications between a base station and a plurality of mobile stations, the base station has a transmitting device in which a plurality of information sequences S1 through Sn are respectively spread by multipliers 11 through 1n with a common spreading code from a spreading code generator circuit 10, the spread codes are provided to transmitting timing control circuits 21 through 2n and then added by an adder 30 to perform transmitting timing offset multiplexing and then the spread signals are transmitted to the mobile stations at different transmitting timing. The mobile stations each have a receiving device which receives that one of the transmitted signals which was transmitted at timing predetermined for the mobile station and despreads the received signal with the same spreading code as that used in the transmitting device, thereby reconstructing the original information sequence concerned.

5 Claims, 19 Drawing Sheets

FIG. 18
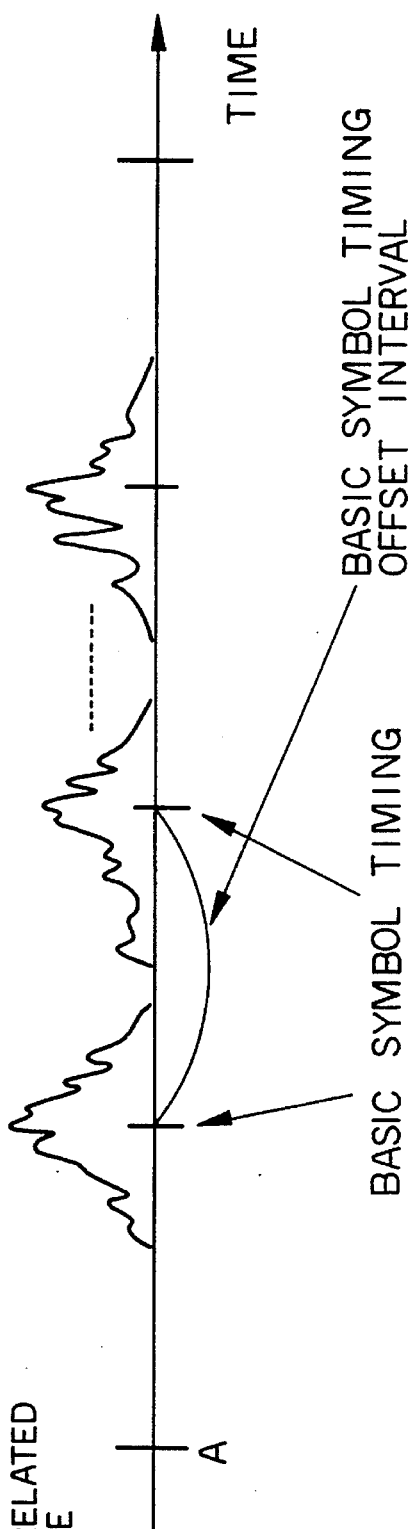
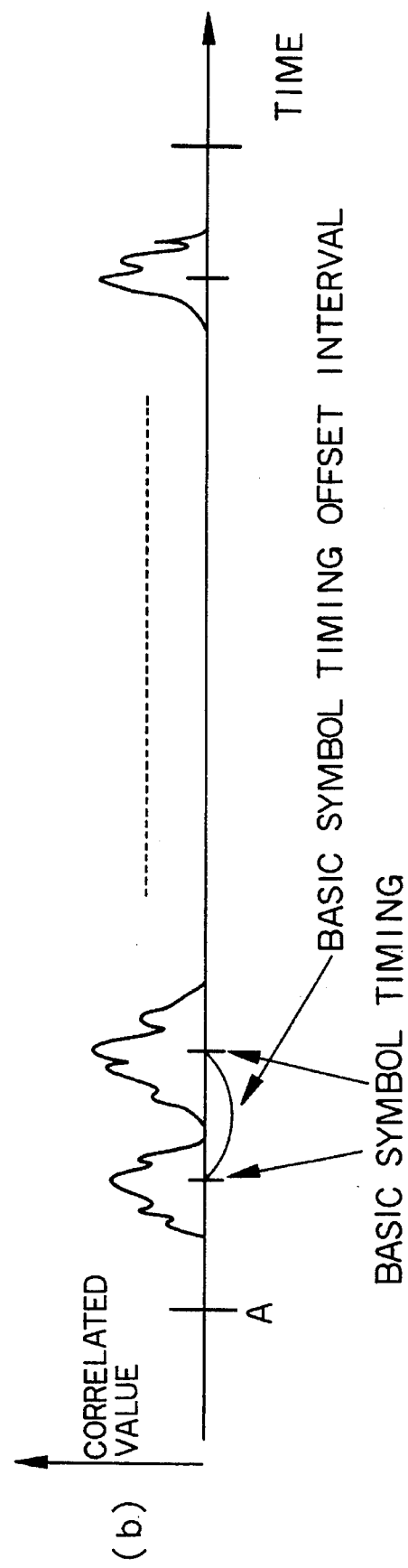

CODE DIVISION MULTIPLE ACCESS MOBILE COMMUNICATION SYSTEM

TECHNICAL FIELD

The present invention relates to a mobile communication system which utilizes a code division multiple access (CDMA) system for communications between a base station and a plurality of mobile stations.

PRIOR ART

The code division multiple access (CDMA) system is a communication system which multiplexes information sequences to be transmitted at the same frequency, by spreading them with different spreading codes for respective channels; for example, in literature 1: R. C. Dixon, "Spread Spectrum Communication System," published by Jatec, there are described in detail its system configuration and capabilities. Now, a brief description will be given of a system called a direct sequence CDMA system.

FIG. 19 shows the construction of a transmitting device in a typical CDMA communication system. n information sequences $S1, S2, \ldots, Sn$ are input into multipliers $11, 12, \ldots 1n$, wherein they are spread by spreading codes $C1, C2, \ldots, Cn$ from a spreading code generator circuit 2, respectively. The output signals from the multipliers $11, 12, \ldots, 1n$ are added by an adder 3 at the same timing to generate a transmission signal.

On the other hand, the signal received at the receiving side is despread by the same spreading codes $C1, C2, \ldots, Cn$ as those used in the transmitting device, by which the original information sequences $S1, S2, \ldots, Sn$ are generated. As the spreading codes $C1, C2, \ldots, Cn$, code sequences are usually chosen which are excellent not only in self-correlation characteristic (letting the time offset between two correlating code sequence be represented by $\tau$, the correlation value is large for $\tau=0$ and small for other values of $\tau$) but also in mutual-correlation characteristic, that is, low in the correlation with other spreading codes (code sequences whose mutual-correlation value is smaller than a certain value which is offset for any given time).

On the other hand, there has been proposed a scheme of repeatedly using the same spreading code in a plurality of cells in an application of the CDMA system to a multi-cellular mobile communication system (Japanese Pat. Pub. No. 56290/83). It is expected that this scheme will make it possible to increase the number of communication channels and the system capacity.

However, very few classes of code sequences satisfy the above-mentioned requirements for spreading codes and the number of spreading codes in each class is also small. Accordingly, the conventional CDMA communication system which assigns a different spreading code to each communication channel is inevitably limited in the number of channels available for communication, and hence is not suitable for use as a radio telecommunication system of large channel capacity such as a mobile radio communication system.

With the scheme of reusing the same spreading code in a plurality of cells in the multi-cellular mobile communication system, the reuse of the same spreading code in adjacent cells that are not sufficiently far apart would degrade the channel or speech quality owing to interference or interactions, thus imposing limitations on the increase in the channel capacity.

SUMMARY OF THE INVENTION

An object of the present invention is to provide a CDMA mobile communication system which makes it possible to effectively increase the number of communication channels through use of a limited number of spreading codes.

The mobile communication system according to the present invention which utilizes the code division multiple access scheme for communications between at least one base station and a plurality of mobile stations, characterized in:

that the base station has a transmitting device which spreads a plurality of information sequences by the same spreading code and then transmits them to the plurality of mobile stations at different timing;

that the mobile stations each have a receiving device which receives that signal from the transmitting devices of the base station which was transmitted thereto at timing predetermined therefor and despreads the received signal by the same spreading code as that used in the transmitting device, thereby reconstructing the original information sequence;

that the base station has a plurality of transmitting devices and uses different spreading codes therefor; and that such base stations are installed at a plurality of places and those at least two predetermined ones of these base stations which are spatially far apart are allowed to use the same spreading code.

The CDMA mobile communication system according to the present invention is also characterized in:

that a plurality of base stations each have a transmitting device which spreads an information sequence by a common spreading code and transmits the spread signal to mobile stations at timing different for each base station;

that the mobile stations each have a receiving device which receives that signal from the transmitting devices of the base stations which was transmitted at timing predetermined therefor and despreads the received signal by the same spreading code as that used in the transmitting device to obtain the original information sequence;

that the transmitting device of each base station spreads a plurality of information sequences by a plurality of spreading codes and transmits the spread signals to the mobile stations at the same timing; and that those at least two predetermined ones of these base stations which are spatially far apart are allowed to transmit the spread signals at the same timing.

The CDMA mobile communication system according to the present invention is further characterized in:

that a base station has a transmitting device which spreads a plurality of information sequences by the same spreading code and transmits the spread signals to mobile stations at timing offset by a transmitting timing offset value preset in accordance with the transmitting power used or the size of a cell which is the coverage of the base station; and that mobile stations each have a receiving device which receives that signal from the transmitting device of the base station which was transmitted at timing predetermined therefor and despreads the received signal by the same spreading code as that used in the transmitting device to obtain the original information sequence.

In a first embodiment of the CDMA mobile communication system according to the present invention, a plurality of information sequences are spread by the same spreading code in the base station and the spread signals are transmitted therefrom to a plurality of mobile stations at different timing; that is, the transmitting timing offset is multiplexed to provide each spread signal with a transmitting timing offset peculiar thereto. By this, communication channels of the same number as that of the transmitting offsets are formed although the same spreading code is used.

On the other hand, each mobile station receives that transmitted signal which was transmitted at timing predetermined for the mobile station and despreads the received signal by the same spreading code as that used in the transmitting device, by which the original information sequence is easily reconstructed.

Moreover, in the case of using different spreading codes in a plurality of transmitting devices provided in one base station, it is possible to communicate with mobile stations at the same timing by simultaneously using the different spreading codes—this provides an increased number of communication channels.

Furthermore, in the case of using the same spreading code in the transmitting devices of two base stations spatially far apart, the so-called spatial re-use of spreading codes and the transmitting timing offset multiplexing together provide increased system capacity.

In a second embodiment of the CDMA mobile communication system according to the present invention, information sequences are spread by a common spreading code in a plurality of base stations and are transmitted to a plurality of mobile stations at timing different for each base station. In this case, a basic symbol timing interval on which the transmitting timing for the base stations is based is selected such that the use of the same spreading code in a plurality of base stations will not cause interference. Letting the number of base stations using the common spreading code be represented by N, there will be established N independent communication channels for the same spreading code.

On the other hand, each mobile station receives the signal which was transmitted at timing predetermined for the mobile station and despreads the received signal by the same spreading code as that used in the transmitting device, by which the original information sequence is easily reconstructed.

Moreover, in the case of using a plurality of different spreading codes in the transmitting device of the base station, it is possible to transmit a plurality of information sequences by simultaneously using these different spreading codes—this provides an increased number of communication channels.

Furthermore, by the spatial re-use of transmitting timing that transmitting devices of two base stations spatially far apart are allowed to transmit spread signals at the same timing, it is possible to use more communication channels throughout the entire system—this provides increased system capacity.

In further embodiment of the CDMA mobile communication system according to the present invention, a plurality of information sequences are spread by the same spreading code in a base station and the spread signals are transmitted to a plurality of mobile stations at different timing thereby multiplexing the transmitting timing offset to provide each spread signal with a transmitting offset peculiar thereto. In this instance, the transmitting timing offset interval is selected in accordance with the transmitting power or cell size of the base station; for example, in a base station whose transmitting power or cell is small, the transmitting timing offset interval is set short to permit accommodation of many mobile stations, whereas in a base station whose transmitting power or cell is large the transmitting timing offset interval is set long to avoid overlapping of delay profiles. Thus, the channel quality can be improved.

BRIEF DESCRIPTION OF THE DRAWINGS

FIG. 18 is a graph showing, by way of example, the correlation output in base stations of cells 1 and 2 in the sixth embodiment.

DISCLOSURE OF THE INVENTION

(Embodiment 1)

Figure 1:
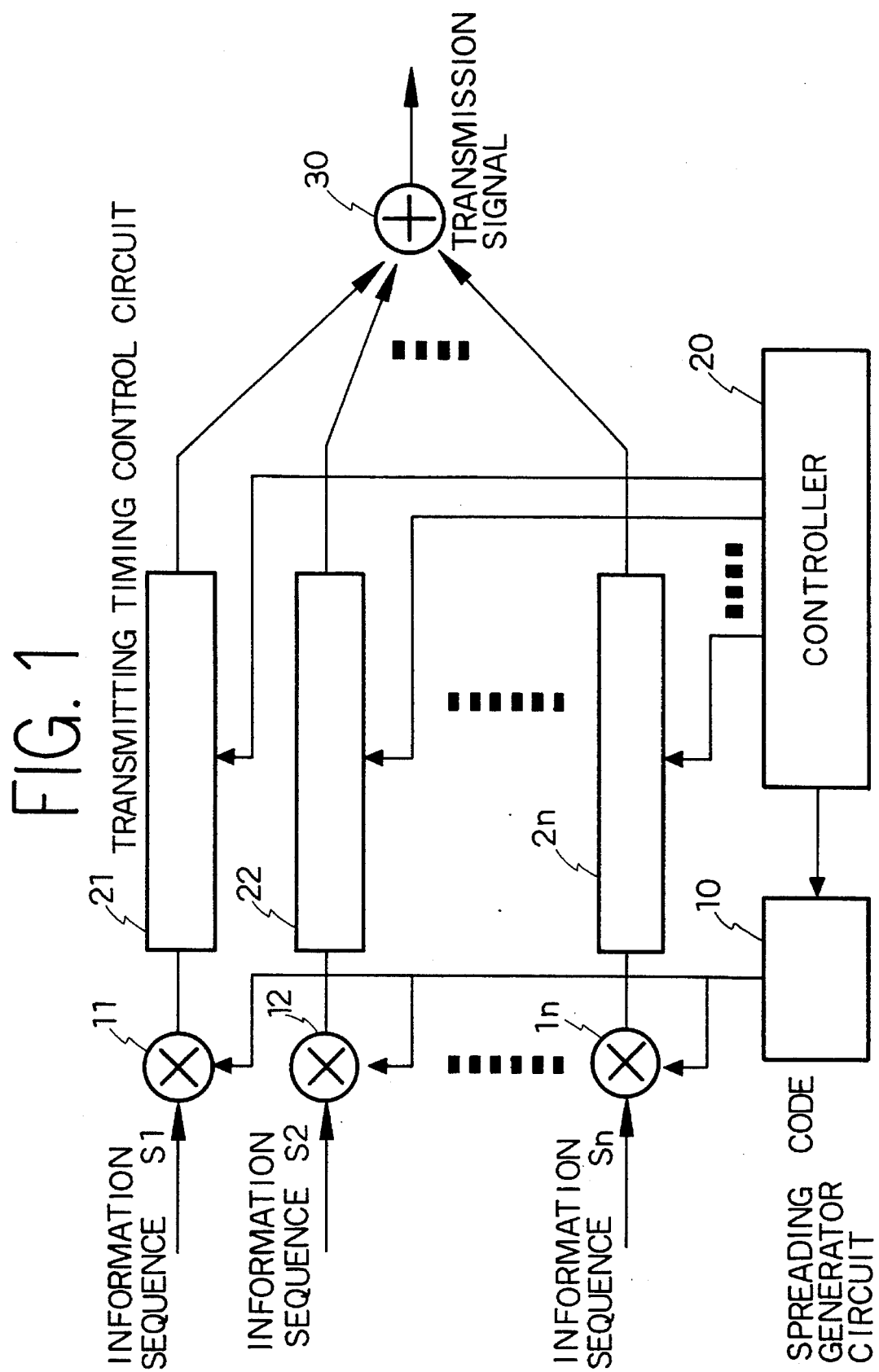
FIG. 1 is a block diagram illustrating the configuration of a transmitting device provided in a base station in a first embodiment of the present invention.

FIG. 1 illustrates in block form the construction of a transmitting device which is provided in a base station in Embodiment 1, for transmitting to n mobile stations at the same time.

In FIG. 1, a spreading code generator circuit 10 is controlled by a controller 20 to generate a spreading code in synchronism with each of information sequences S1, S2, . . . , Sn. Multipliers 11, 12, . . . , 1n multiply the information sequences S1, S2, . . . , Sn with the same spreading code supplied from the spreading code generator circuit 10 to spread the information sequences S1, S2, . . . , Sn. Transmitting timing control circuits 21, 22, . . . , 2n are controlled by the controller 20 to delay (or offset) the output signals from the multipliers 11, 12, . . . , 1n in correspondence to the n mobile stations, respectively, thereby controlling the transmitting timing. This operation is called a transmitting timing offset. An adder 30 adds the output signals from the transmitting timing control circuits 21, 22, . . . , 2n into a transmission signal.

Next, the operation of this transmitting device will be described. The information sequences S1, S2, . . . , Sn, which are to be transmitted, are spread by the multipliers 11, 12, . . . , 1n with the same spreading code from the spreading code generator circuit 10 and delayed by the transmitting timing control circuits 21, 22, . . . , 2n for transmitting timing control, thereafter being added by the adder 30 into a transmitting timing offset multiplexed transmission signal. The transmission signal thus generated is output from a transmission circuit part, not shown, and is then transmitted via a radio circuit to the n mobile stations.

Figure 2:
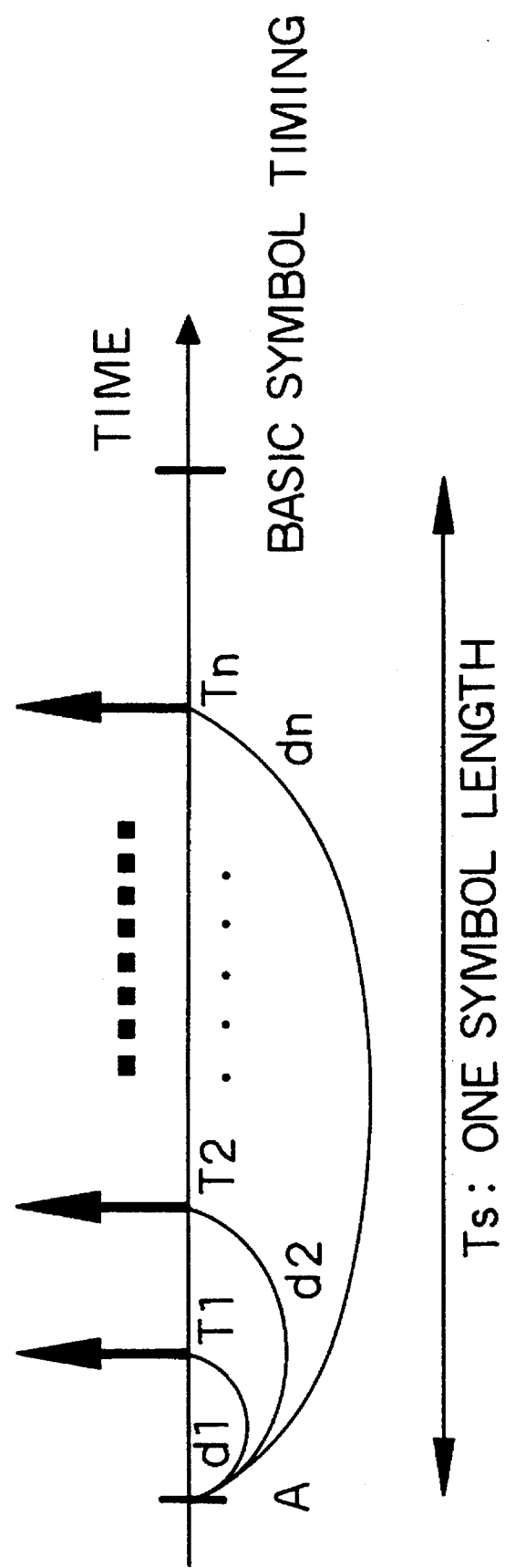
FIG. 2 is a diagram showing an example of a transmitting timing offset in the first embodiment.

FIG. 2 shows an example of the above-mentioned transmitting timing offset. In a period of time defined by one symbol length Ts of the information sequences S1, S2, . . . , Sn a plurality (n) of basic symbol timing T1 through Tn are set and delays corresponding to the respective basic symbol timing are provided in the transmitting timing control circuits 21, 22, . . . , 2n. Letting A represent a basic time, the delay is d1 at the timing T1, d2 at T2 and dn at Tn. The interval of this transmitting timing is set to a value substantially corresponding to the sum of a delay spread and a guard time at the time of reception by the mobile station.

Figure 3:
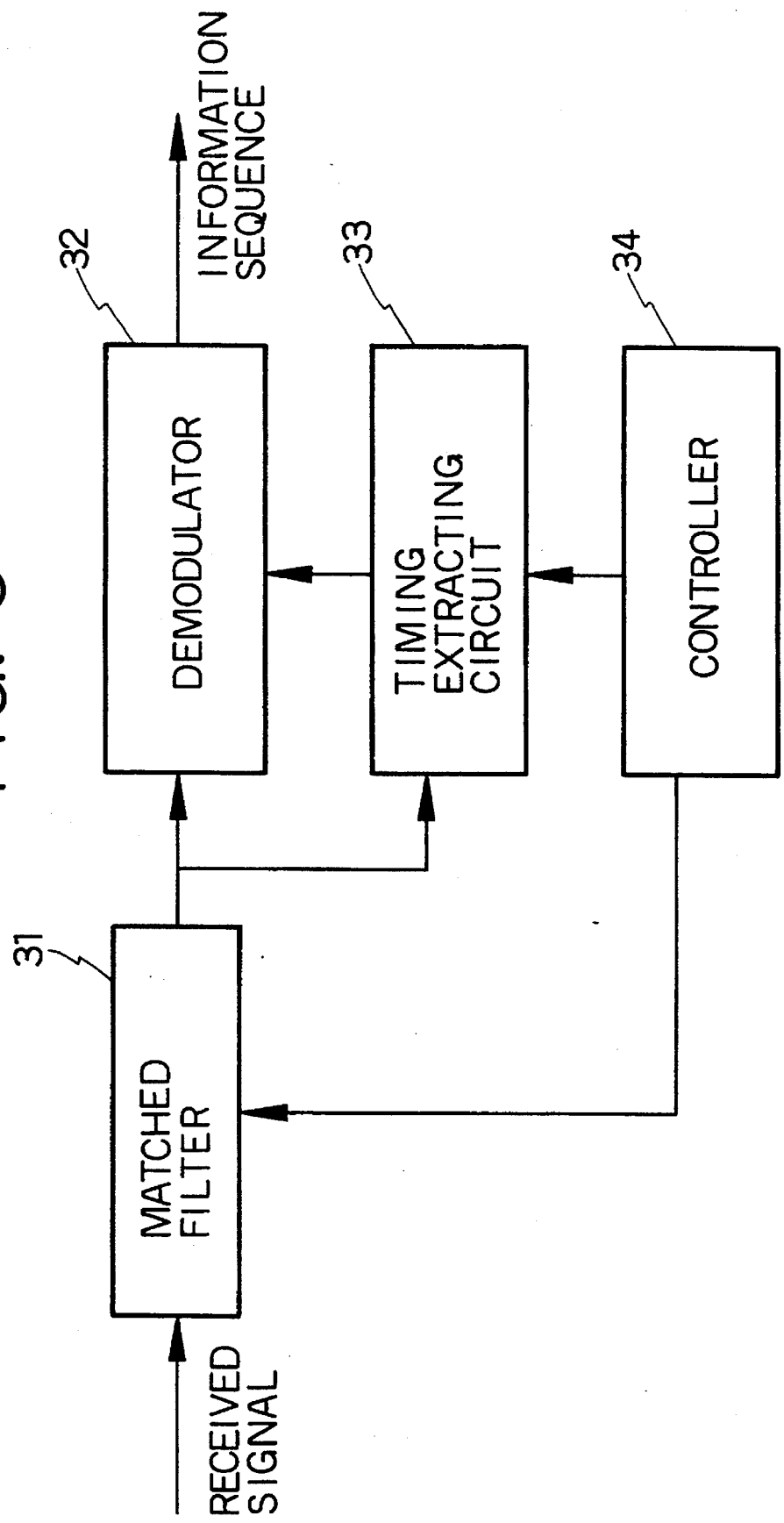
FIG. 3 is a block diagram illustrating the configuration of a receiving device provided in a mobile station in the first embodiment.

FIG. 3 illustrates in block form the construction of a receiving device which is provided in each of the n mobile stations to receive the signal which is transmitted from the transmitting device shown in FIG. 1. The receiving device of this example employs a matched filter as a correlator. The illustrated receiving device comprises a matched filter 31, a demodulator 32, a timing extracting circuit 33 and a controller 34. The matched filter 31 detects the correlation between a spreading code from the controller 34 and the received signal. The timing extracting circuit 33 extracts the received timing of the received signal from the correlation output of the matched filter 31 and indicates the received timing to the demodulator 32.

The demodulator 32 reconstructs the original information sequence Si (i=1, 2, . . . , n) from the output of the matched filter 31 and the output of the timing extracting circuit 33. A typical demodulator is a RAKE demodulator, which is described in detail in, for example, literature 2: U. Grob, A. L. Welti, E. Zollinger, R. Kung and H. Kaufmann, "Microcellular Direct-Sequence Spread-Spectrum Radio System Using N-Path RAKE Receiver," IEEE JSAC, Vol. SAC-8, No. 5, pp. 772–780, June, 1990.

The controller 34 supplies the spreading code to the matched filter 31 and provides local information at the time of extracting the received timing by the timing extracting circuit 33.

Figure 4:
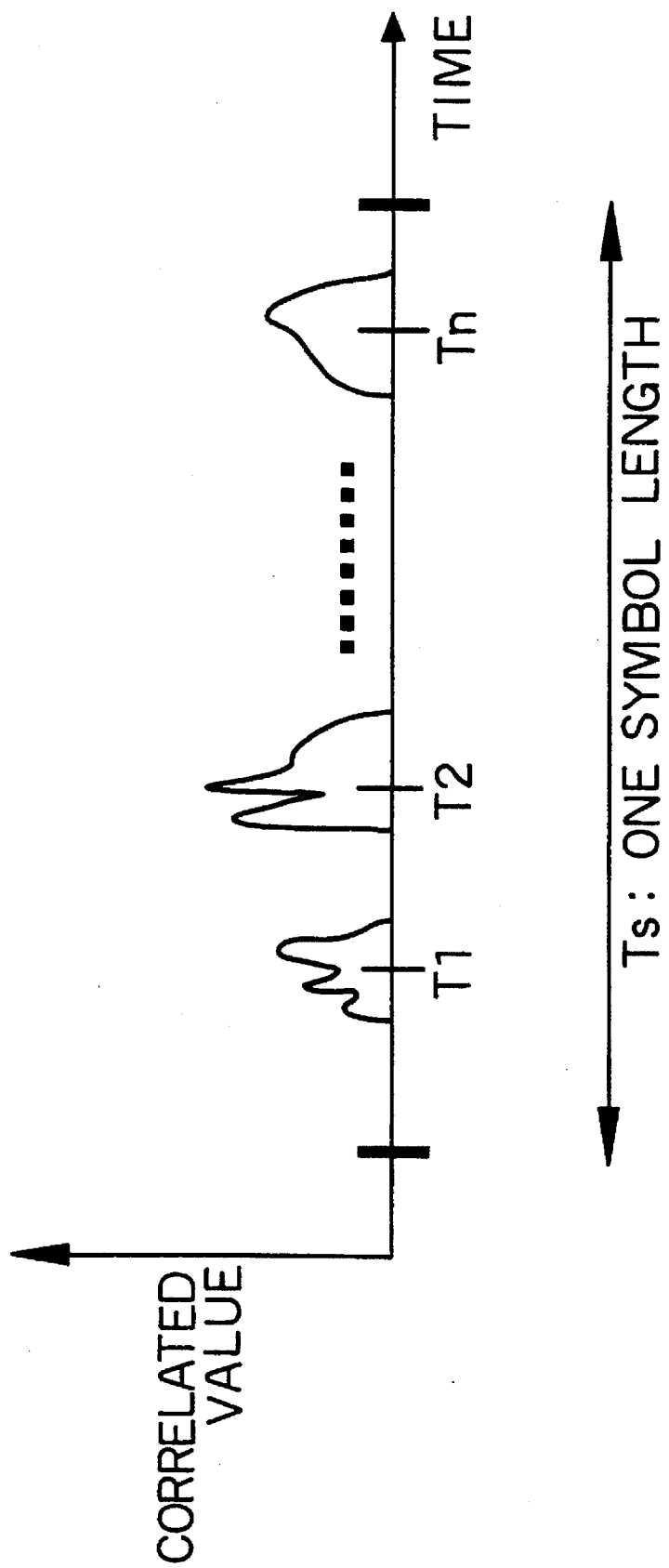
FIG. 4 is a graph showing an example of a correlation output from a matched filter in FIG. 3.

Next, the operation of the receiving device will be described. The received signal, that is, the signal transmitted from the transmitting device in the base station of the FIG. 1 construction and received by the receiving device of FIG. 3, is applied first to the matched filter 31. The matched filter 31 is being supplied with the same spreading code as that generated by the spreading code generator circuit 10 in the transmitting device of FIG. 1 and correlates the spreading code with the received signal to despread the latter, generating the correlated output. FIG. 4 shows an example of the correlated output from the matched filter 31, the abscissa representing time and the ordinate the correlated value. Since the signal received by the receiving device of FIG. 3, that is, the transmitted signal from the transmitting device of FIG. 1, has been subjected to the transmitting timing offset multiplexing as described previously, large correlated values are detected at the points in time corresponding to the basic symbol timing T1 through Tn.

The timing extracting circuit 33 is presupplied, from the controller 34, with information about the timing for receiving the signal that is transmitted to this mobile station, for example, information about the reference time A and the time length therefrom to the basic symbol timing Ti (i=1, 2, . . . , n); the timing extracting circuit uses this information to recognize the receiving timing in this station from the output of the matched filter 31. Upon detecting that this receiving timing is reached, the timing extracting circuit 33 indicates it to the demodulator 32. The demodulator 32 reconstructs the information sequence Si transmitted to this station, from the output of the matched filter 31 at the receiving timing indicated by the timing extracting circuit 33.

In a direct spread-code division multiple access (DS-CDMA) system using spreading codes, even if signals are simultaneously transmitted to a plurality of mobile stations which use the same spreading code, each mobile station is capable of capturing only the portion of a profile to be received and reconstructing the information sequence unless delay profiles of the transmitted signals overlap. This means that the information sequence in each channel can independently be demodulated and decoded regardless of the transmitting timing offset multiplexing.

Thus, the transmitting timing offset multiplexing as in this embodiment provides independent communication channels of the same number as the transmitting timing offset number n although only one spreading code is used in common to a plurality of mobile stations. Hence, it is possible to obtain communication channels n times as many as in the past by use of a limited number of spreading codes of excellent self-correlation and mutual correlation characteristics—this permits implementation of a CDMA mobile communication system of large channel capacity.

Incidentally, the demodulator 32 may also be an ARD demodulator such as described in literature 3: Akihiro Higashi, Tadashi Matsumoto, "BER Performance of Adaptive RAKE Diversity (ARD) in DPSK DS/CDMA Mobile Radio," The Transactions of the Institute of Electronics, Information and Communication Engineers of Japan, SST92-16, June, 1992 or literature 4: Japanese Pat. Appln. No. 83947/92 "Spread Spectrum Receiver." With the use of the ARD demodulator, even if the delay profiles of the transmitted signals overlap to some extent, it is possible to reconstruct the transmitted signal sequence—this enables the transmitting timing offset to be effected at reduced intervals and hence increases the transmitting timing offset number n accordingly.

While this embodiment uses a matched filter as the correlator, a combined version of sliding correlators can also be used as long as it is able to detect a plurality of basic symbol timing.

(Embodiment 2)

Embodiment 1 has been described in connection with the case where one base station uses one spreading code, and consequently, Embodiment 1 provides communication channels of the same number as the transmitting timing offset number n as described above.

In contrast thereto, according to Embodiment 2, each base station has a plurality of transmitting devices of the FIG. 1 construction, which are common in the use of the plurality of transmitting timing (T1–Tn) but use different spreading codes. The respective spreading codes are code sequences each of which has excellent self-correlation and mutual-correlation characteristics as referred to previously. In this instance, letting the number of transmitting devices provided in one base 10 station be represented by m, the number of available communication channels is m×n.

Figure 5:
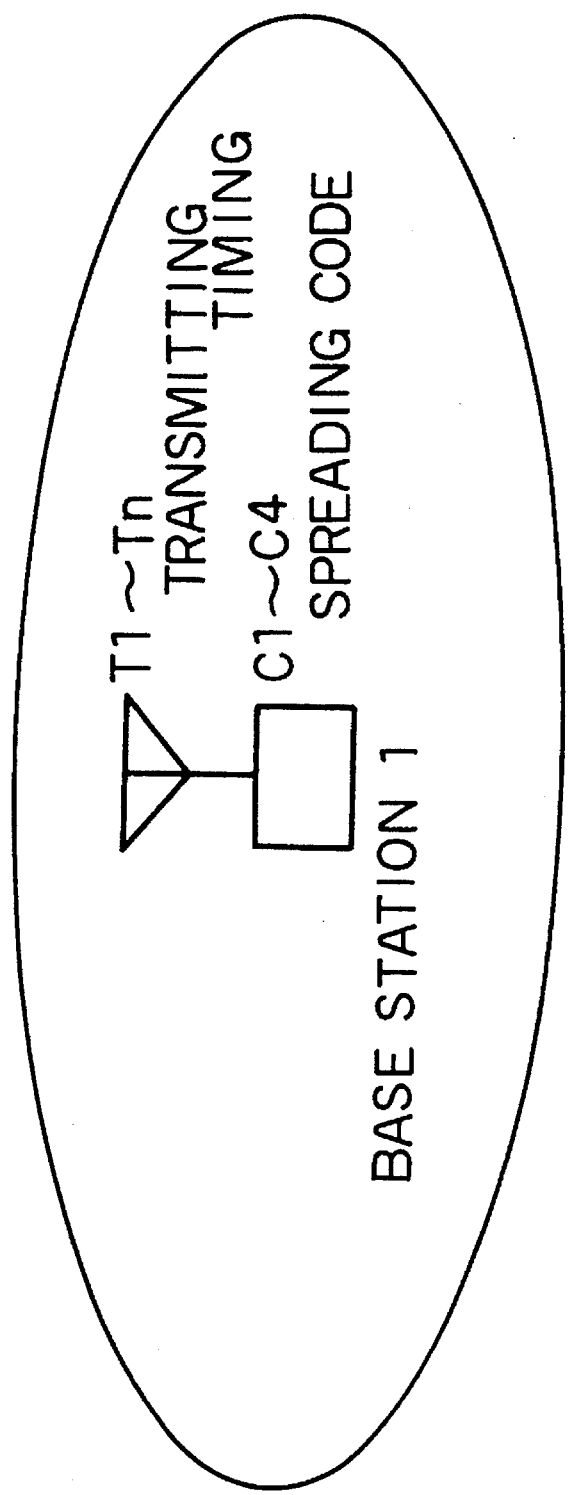
FIG. 5 is a diagram showing, by way of example, a combination of transmitting timing and a plurality of spreading codes in the case of using the spreading codes in one base station in a second embodiment of the present invention.

FIG. 5 shows, by way of example, such transmitting timing and spreading codes. In FIG. 5, the base station is shown to use n transmitting timing T1 through Tn and four spreading codes C1 through C4; accordingly, the number of available communication channels is 4×n.

(Embodiment 3)

While Embodiment 1 has been described in respect of the CDMA mobile communication system wherein each base station has one transmitting device and adopts the transmitting timing offset scheme, Embodiment 3 will be described in connection with the CDMA mobile communication system which employs a plurality of base stations.

Figure 6:
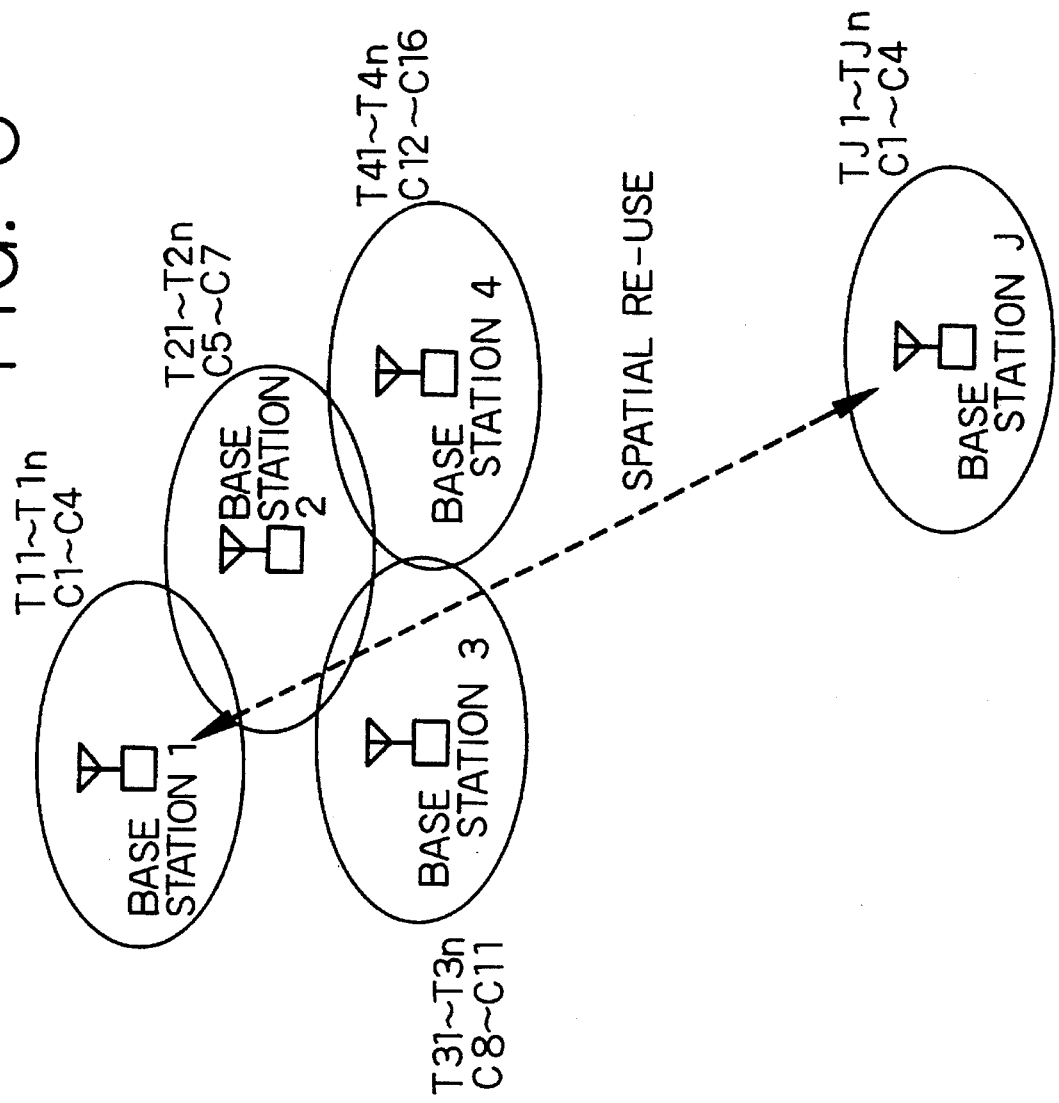
FIG. 6 is a diagram showing, by way of example, a plurality of base stations, a plurality of cells formed by them and a combination of transmitting timing and spreading codes in each base station in accordance with a third embodiment of the present invention.

FIG. 6 shows an example of a multi-cellular mobile communication system, together with examples of transmitting timing and spreading codes for use in each base station. T11 through T1n are transmitting timing in a base station 1 and Ti1 through Tin transmitting timing in a base station 1. When spreading codes of excellent self-correlation and mutual-correlation characteristics, such as referred to previously, are used, substantially no interference or interaction occurs between channels of different spreading codes; hence, there is no need of using different timing for each base station i. That is, partial or full coincidence of respective transmitting timing T11–T1n, T21–T2n, . . . , TJ1–TJn would not matter.

Furthermore, as described in literature 5: "Fundamentals of Mobile Communication," edited by the Institute of Electronics, Information and Communication Engineers of Japan, electric waves attenuate in inverse proportion to the square of the distance in the free space and about the fourth power of the distance in a city area, and therefore, no interference occurs between places spatially far apart to some extent, even if the same spreading code is used. This can be utilized for spatial re-use of spreading codes. For example, as shown in FIG. 6, the base station J sufficiently far apart from the base station 1 is allowed to use the same spreading code as that used by the latter.

With the combined use of such spatial re-use of spreading codes and the aforementioned transmitting timing offset multiplexing, it is possible to increase the number of spreading codes available throughout the entire system. Hence, the combined use of such two schemes provides an increased number of communication channels available for use and permits implementation of a CDMA mobile communication system of very large channel capacity.

Incidentally, it is also possible to combine the system configurations of Embodiments 1 and 2.

(Embodiment 4)

Figure 7:
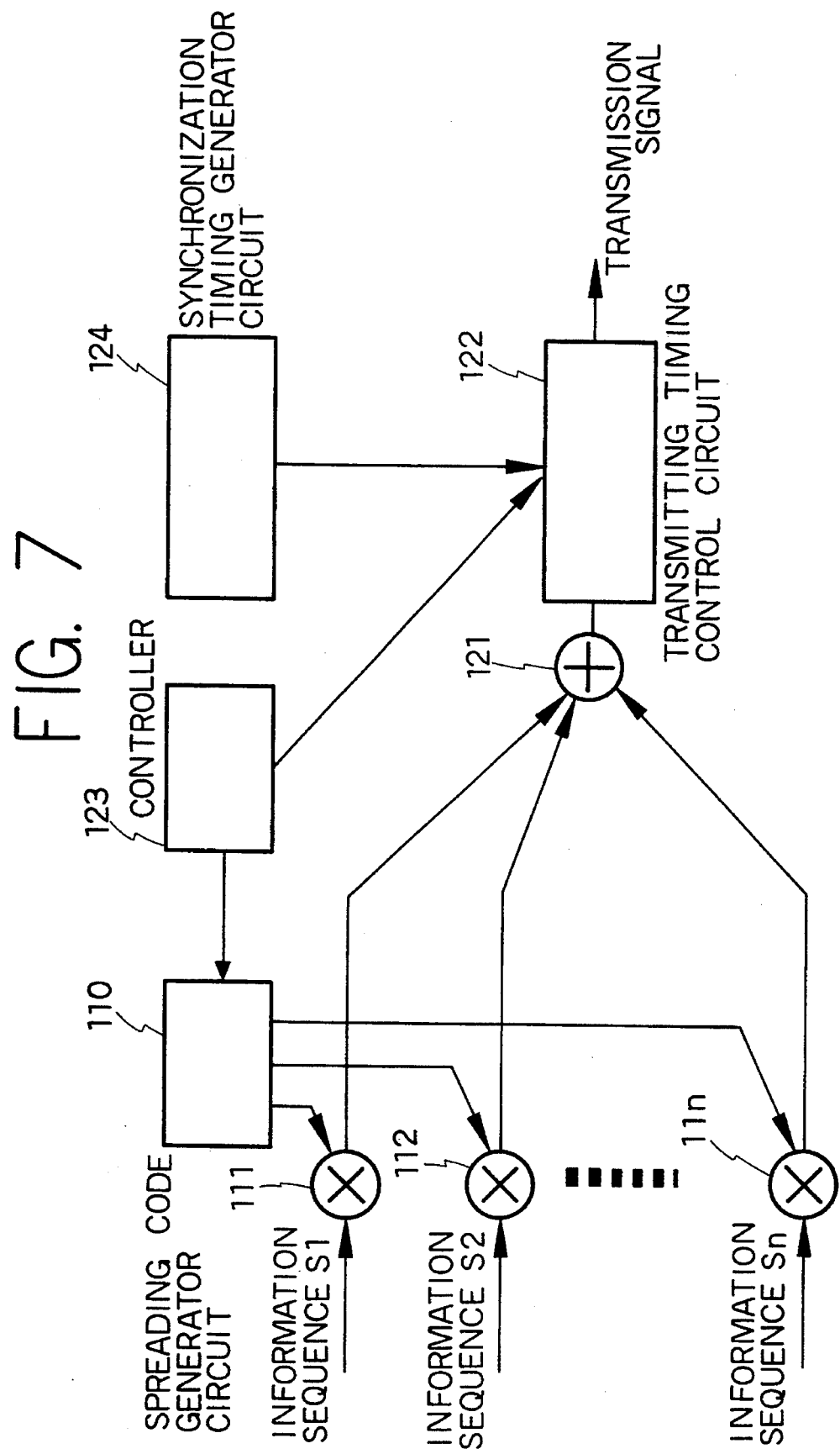
FIG. 7 is a block diagram illustrating the configuration of a transmitting device provided in a base station in a fourth embodiment of the present invention.

FIG. 7 illustrates in block form the construction of a transmitting device which is provided in each base station in this embodiment. The transmitting device is shown to transmit to n mobile stations at the same time.

The transmitting device comprises a spreading code generator circuit 110, multipliers 111, 112, . . . , 11n, an adder 121, a transmitting timing control circuit 122, a controller 123 and a synchronization timing generator circuit 124. The spreading code generator circuit 110 generates spreading codes C1, C2, . . . , Cn in synchronization with the information sequences S1, S2, . . . , Sn, respectively. The multipliers 111, 112, . . . , 11n multiply the information sequences S1, S2, . . . , Sn by the spreading codes C1, C2, . . . , Cn from the spreading code generator circuit 110, respectively, thereby spreading the information sequences S1, S2, . . . , Sn. The adder 121 adds together the output signals from the multipliers 111, 112, . . . , 11n. Based on synchronization timing (basic timing) from the synchronization timing generator 124, the transmitting timing control circuits 122 controls the transmitting timing to transmit the output signal of the adder 121 at basic symbol timing instructed by the controller 123.

Next, the operation of this transmitting device will be described. The information sequences S1, S2, . . . , Sn to be transmitted are added together by the adder 121 after being spread by the multipliers 111, 112, . . . , 11n with the spreading codes C1, C2, . . . , Cn from the spreading code generator circuit 110. The output signal of the adder 121 is controlled in transmitting timing by the transmitting timing control circuit 122 to provide a transmission signal. The thus produced transmission signal is output from a transmitting circuit part, not shown, and is then transmitted via radio channels to n mobile stations. The transmitting timing is adjusted so that the basic symbol timing does not coincide among a plurality of base stations.

Figure 8:
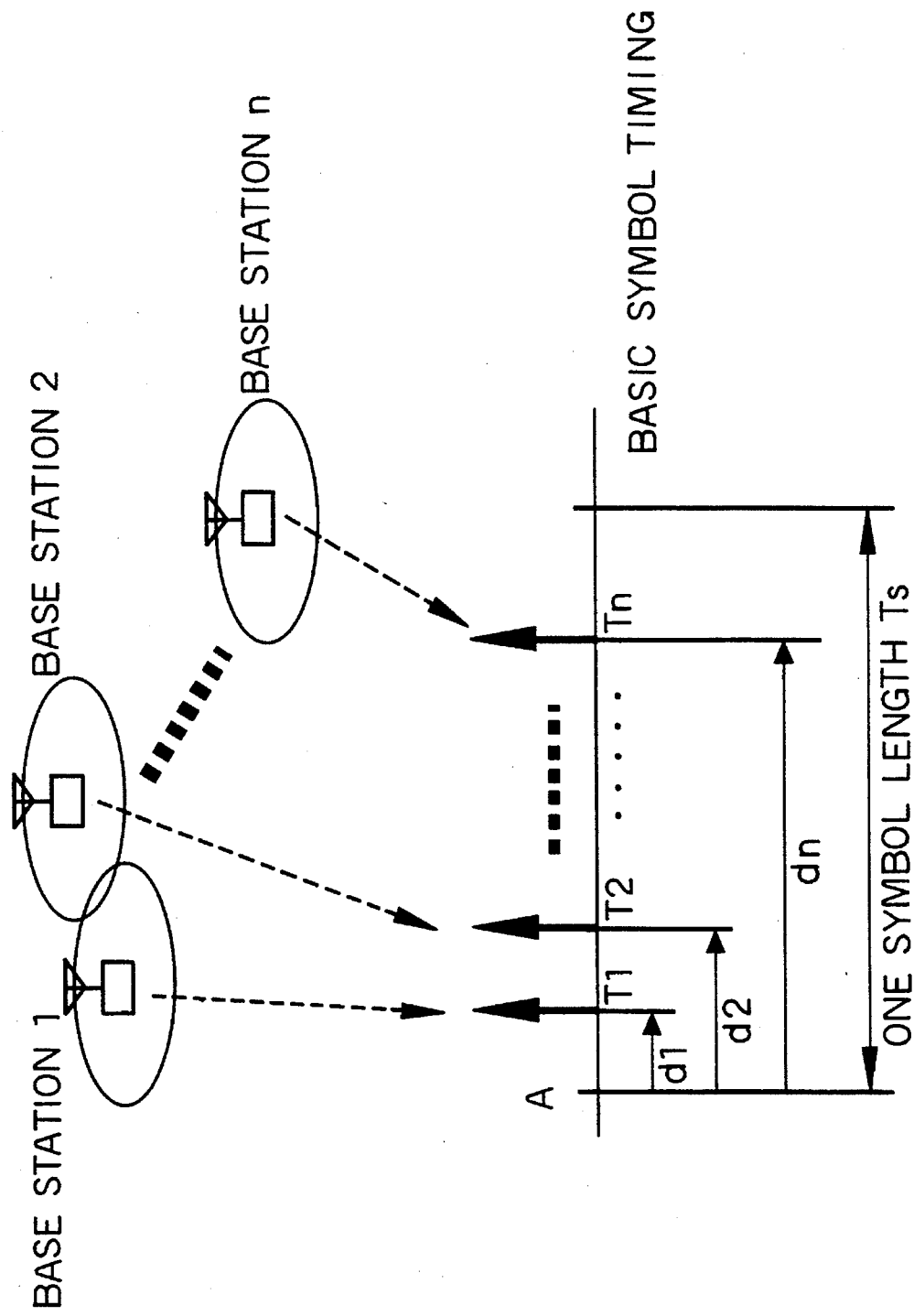
FIG. 8 is a diagram showing an example of setting a basic symbol timing in the fourth embodiment.

FIG. 8 shows an example of the setting of the basic symbol timing in each base station. As shown in FIG. 8, a plurality of basic symbol timing points T1, T2, . . . , Tn are set in the period of one symbol length Ts of the information sequence, and a delay from the basic timing A of each basic symbol timing is provided by the transmitting timing control circuit 122 for each base station. That is, in the case where the base station 1 transmits at the timing T1, the base station 2 at the timing T2 and the base station Tn at the timing Tn, the timing T1 is delayed by d1 relative to the basic timing A, T2 by d2 and Tn by dn. The interval of these basic symbol timing points T1, T2, . . . , Tn is set to a value substantially corresponding to the sum of the delay spread and guard time at the time of receiving a signal by each mobile station.

Figure 9:
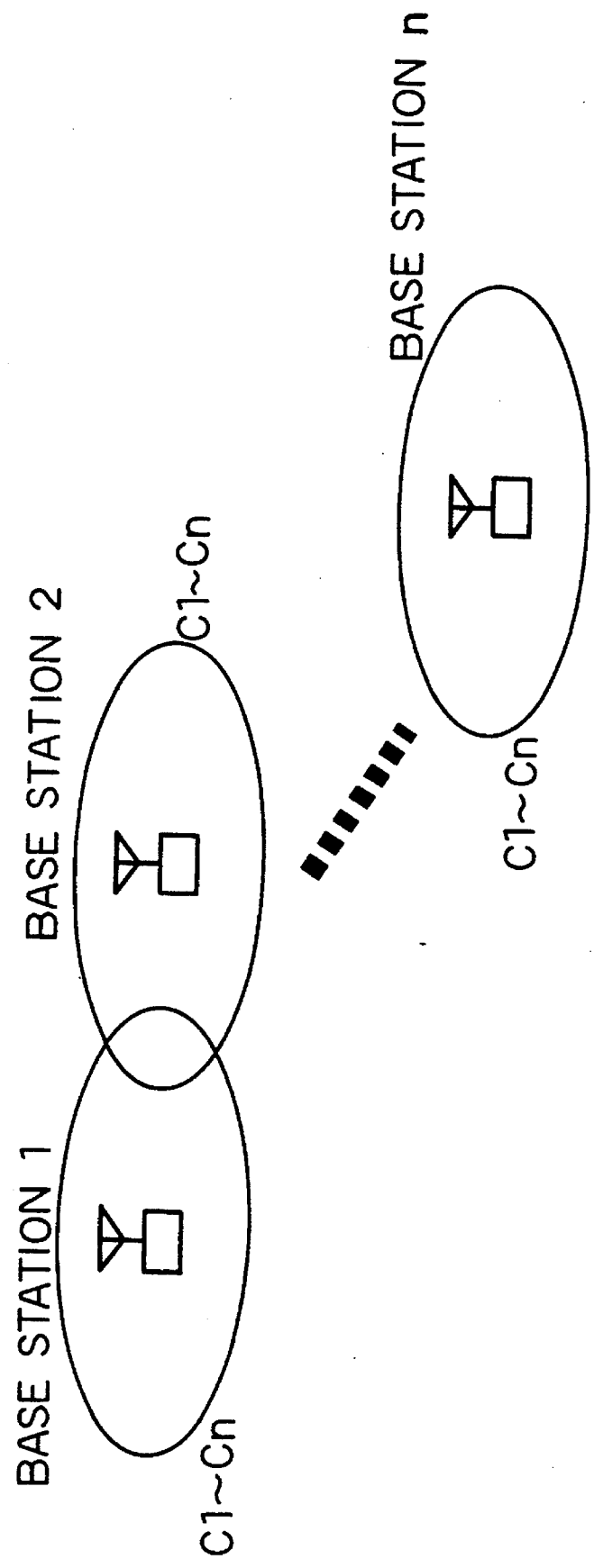
FIG. 9 is a diagram showing an example of spreading codes for use in respective base stations in the fourth embodiment.

In this embodiment, as shown in FIG. 9, the base stations 1, 2, . . . , n are each allowed to use the common spreading codes C1, C2, . . . , Cn, making it possible to substantially increase communication channels available for use. Moreover, to allow respective base stations to use common spreading codes provides a significant advantage in terms of system construction and operation that management of the spreading codes is simple and easy or unnecessary.

Figure 10:
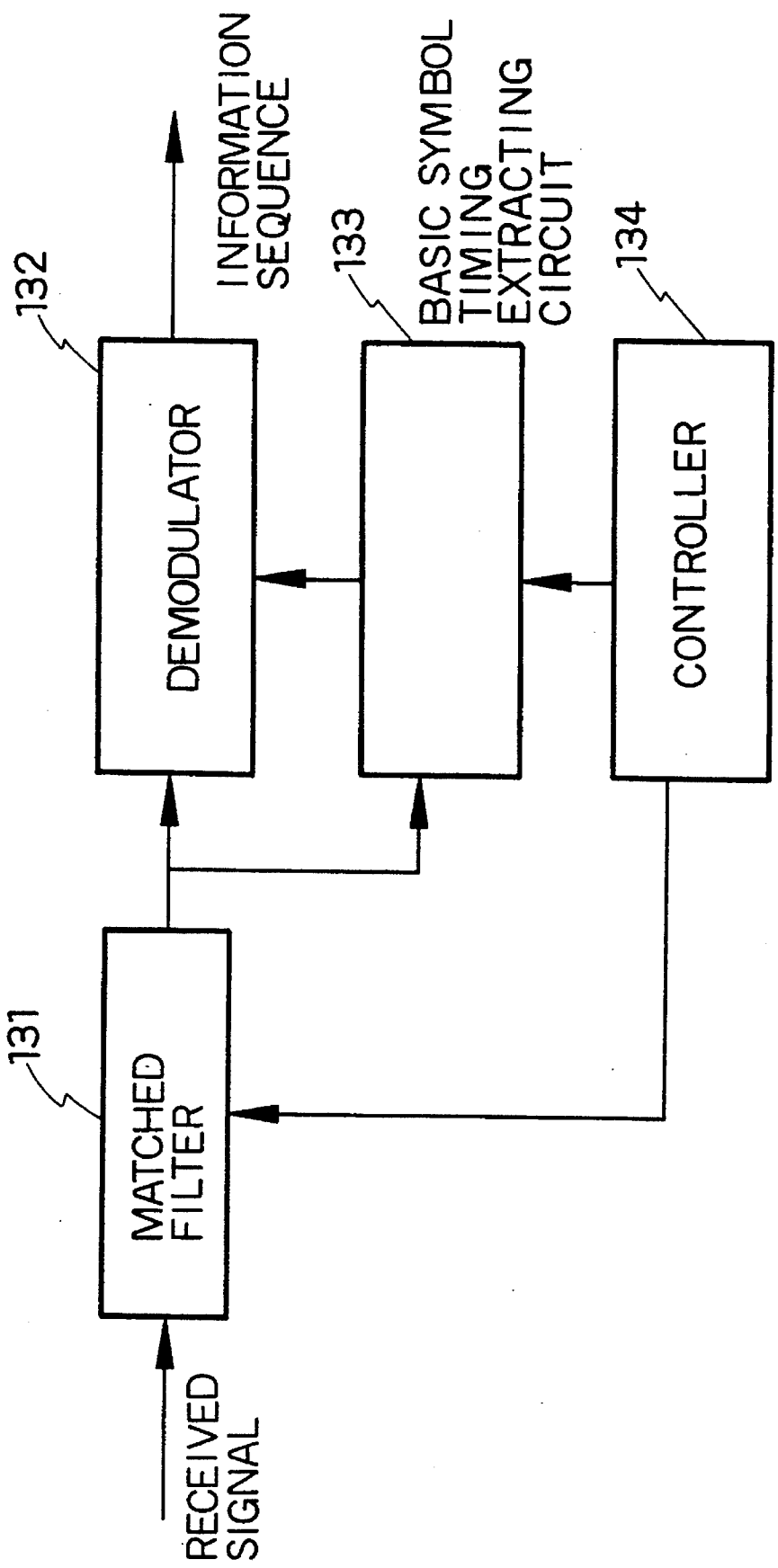
FIG. 10 is a block diagram illustrating the configuration of a receiving device provided in a mobile station in the fourth embodiment.

FIG. 10 illustrates in block form the construction of a receiving device which is provided in each of n mobile stations for receiving the signal transmitted from the transmitting device of FIG. 7. The receiving device in this example uses a matched filter as the correlator. This receiving device comprises a matched filter 131, a demodulator 132, a basic symbol timing extracting circuit 133 and a controller 134. The basic symbol timing extracting circuit 133 extracts from the correlated output of the matched filter 131 the basic symbol timing of the signal transmitted to this station and indicates the extracted timing to the demodulator 132.

The demodulator 132 uses the outputs from the matched filter 131 and the basic symbol timing extracting circuit 133 to reconstruct the original information sequence Si (i=1, 2, ..., n). The demodulator may be the RAKE demodulator described in the aforementioned literature 2.

The controller 134 provides spreading codes to the matched filter 131 and local information to the basic symbol timing extracting circuit 133 when extracting the basic symbol timing.

Next, a description will be given of the operation of this receiving device which is provided in each mobile station. The receiving signal, that is, the signal transmitted from the transmitting device of the FIG. 7 construction in the base station and received by the receiving device of FIG. 10, is fed first to the matched filter 131. The matched filter 131, which is being supplied with the same spreading code as that generated by the spreading code generator circuit 110 in the transmitting device of FIG. 7, correlates the spreading code with the received signal to despread the latter, generating a correlated output.

Figure 11:
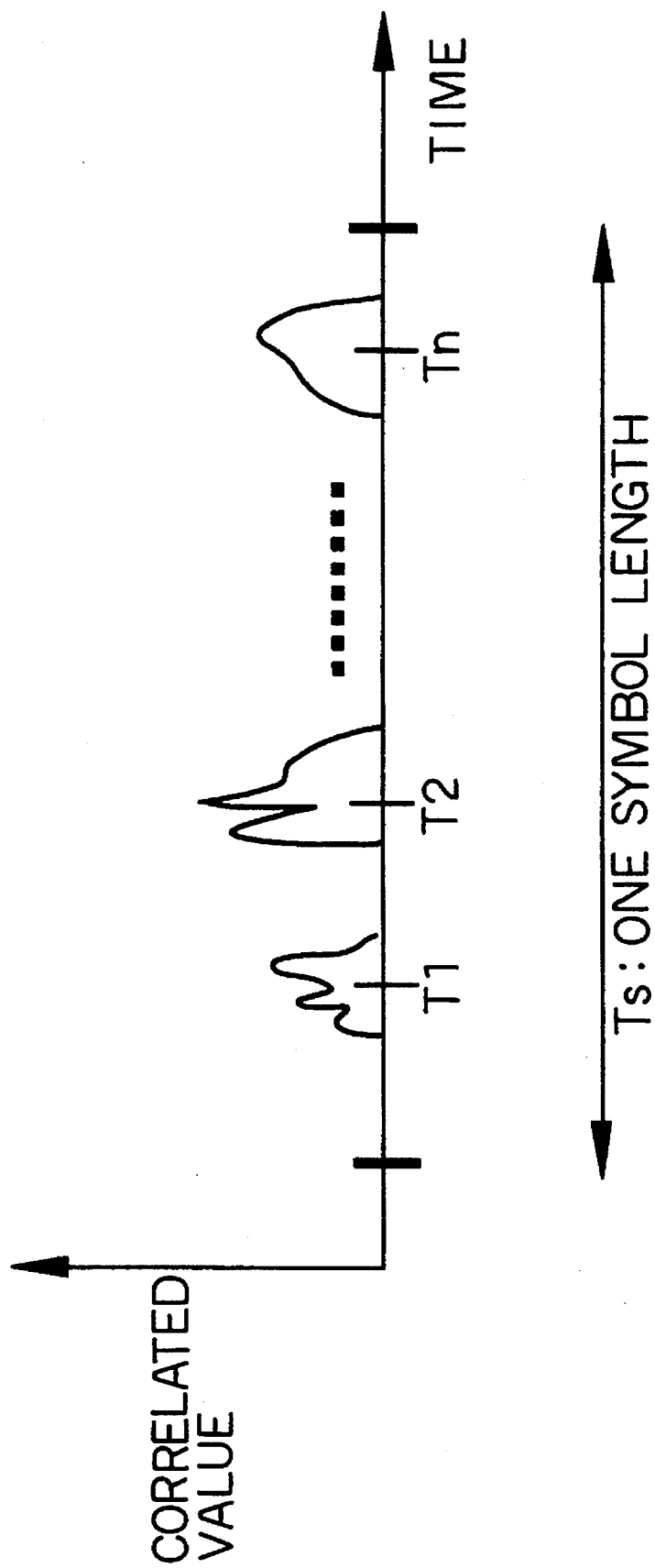
FIG. 11 is a graph showing an example of the correlation output from a matched filter in FIG. 10.

FIG. 11 shows an example of the correlated output from the matched filter 131, the abscissa representing time and the ordinate the correlation value. Since the signal received by the receiving device of FIG. 10, that is, the transmission signal from the transmitting device of FIG. 7, was transmitted at offset basic symbol timing points T1 through Tn for each base station as referred to previously, large correlation values are detected at points in time corresponding to the basic symbol timing points T1 through Tn.

The basic symbol timing extracting circuit 133 is presupplied, from the controller 134, with information about the basic symbol timing of the signal transmitted to this station, for example, information about the basic symbol timing A and the time length therefrom to the basic symbol timing Ti (i=1, 2, ..., n); the basic symbol timing extracting circuit uses this information to recognize from the output of the matched filter 131 the basic symbol timing at which the transmitted signal is to be received by this station. Upon detecting that the basic symbol timing is reached, the basic symbol extracting circuit 133 indicates it to the demodulator 132. The demodulator 132 reconstructs the information sequence Si transmitted to this station, from the output of the matched filter 131 at the basic symbol timing indicated from the basic symbol timing extracting circuit 133.

In a direct spread-code division multiple access (DS-CDMA) system using spreading codes, even if signals are simultaneously transmitted to a plurality of mobile stations which use the same spreading code sequence, it is possible for each mobile station to reconstruct the original information sequence by capturing that portion of a profile which is to be received by the mobile station, unless the delay profiles of the transmitted signals overlap. This means that even if adjacent cells or adjoining base stations use the same spreading code in the multi-cellular mobile communication system, the information sequences in respective channels can independently be demodulated or decoded unless the basic symbol timing points overlap.

Hence, by setting the basic symbol timing different for each of the n base stations as in this embodiment, it is possible to use one spreading code in common to all the base stations and obtain n independent communication channels. By this, it is possible to obtain communication channels of a number n times larger than in the prior art by use of a limited number of spreading codes of excellent self-correlation and mutual-correlation characteristics, permitting the implementation of a CDMA mobile communication system of large channel capacity.

Incidentally, the demodulator 132 may also be formed by, for instance, the ARD demodulator described in literature 3 or 4. The use of this ARD demodulator permits reconstruction of the transmitted signal sequence, even if the delay profiles overlap to some extent. Accordingly, the number n of communication channels can be increased by further decreasing the interval between the basic symbol timing points of the respective base stations.

While this embodiment uses a matched filter as the correlator, a combined version of sliding correlators can also be used as long as it is able to detect a plurality of basic symbol timing points.

(Embodiment 5)

Figure 12:
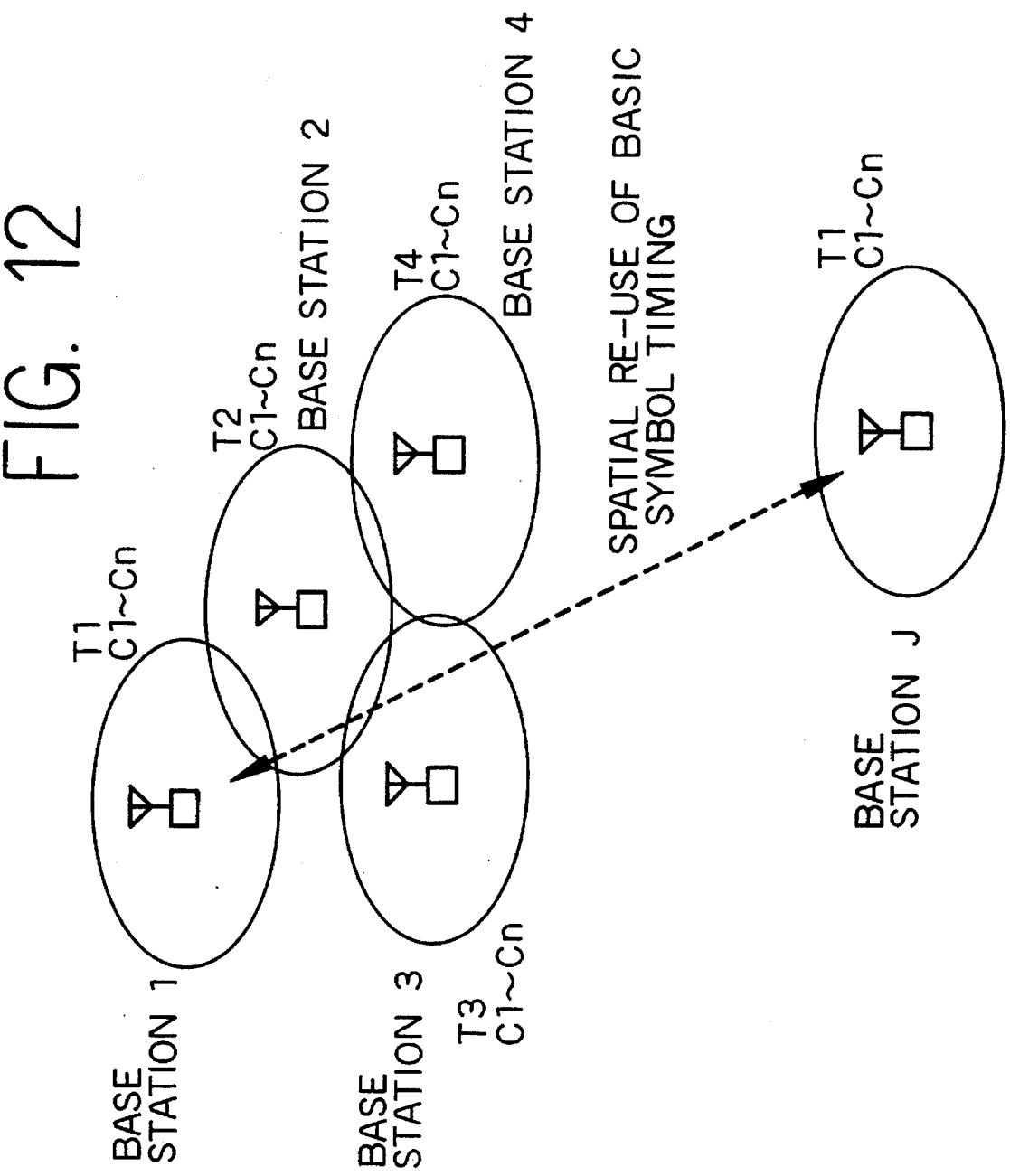
FIG. 12 is a diagram for explaining the re-use of basic symbol timing in a fifth embodiment of the present invention.

FIG. 12 shows an example of a multi-cellular mobile communication system, together with examples of basic symbol timing and spreading codes for use in each base station. T1 is the basic symbol timing in a base station 1 and Ti is similarly the basic symbol timing in a base station i (i=1, 2, ...). By setting the basic symbol timing different for each base station, no interference occurs between the base stations as mentioned previously with respect to Embodiment 3, and consequently, the same spreading codes C1–Cn can be used in common to different base stations.

Furthermore, as described in literature 5, since electric waves attenuate in inverse proportion to the square of distance in the free space and about the fourth power of distance in a city area, no interference occurs between places spatially far apart to some extent, even if the same basic symbol timing is used. This can be utilized to spatially re-use the same basic symbol timing. For example, as shown in FIG. 12, a base station J sufficiently far apart from the base station 1 is allowed to use the same basic symbol timing as that in the base station 1.

With such spatial re-use of the basic symbol timing, it is possible to provide an increased number of communication channels available for use throughout the mobile communication system. Accordingly, the combined use of the spatial re-use of the basic symbol timing and the offset of the basic symbol timing described previously with respect to Embodiment 4 will further increase the number of communication channels available for use, permitting implementation of a CDMA mobile communication system of very large channel capacity.

(Embodiment 6)

Figure 13:
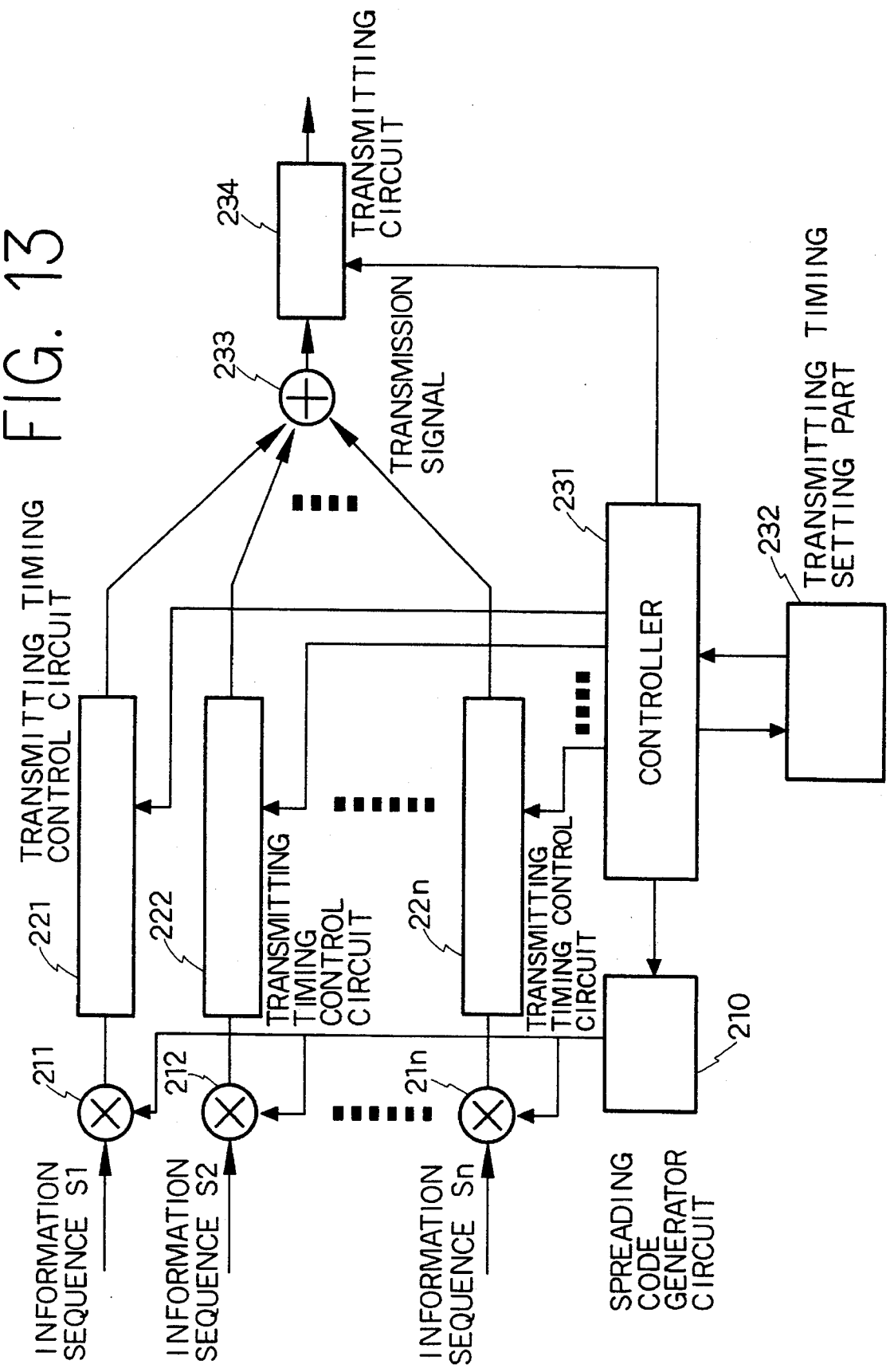
FIG. 13 is a block diagram illustrating the configuration of a transmitting device provided in a base station in a sixth embodiment of the present invention.

FIG. 13 illustrates in block form the construction of the transmitting device which is provided in the base station in this embodiment. The transmitting device is shown to transmit to n mobile stations at the same time.

In FIG. 13, a spreading code generator 210 is controlled by a controller 231 to generate a spreading code in synchronization with each of the information sequences S1, S2, . . ., Sn. Multipliers 211, 212, . . . , 21n multiply the information sequences S1, S2, . . . , Sn by the same spreading code from the spreading code generator 210 to spread the information sequences S1, S2, . . . , Sn.

Transmitting timing control circuits 221, 222, . . . , 22n are controlled by the controller 231 to delay (or offset) the output signals of the multipliers 211, 212, . . . , 21n by different values corresponding to the n mobile stations, respectively, thereby controlling the transmitting timing. This operation is called a transmitting timing offset. More specifically, the controller 231 instructs the basic symbol timing interval to the transmitting timing control circuits 221, 222, . . . , 22n. The transmitting timing control circuits 221, 222, . . . , 22n each set the instructed basic symbol timing interval and indicate it to the controller 231.

An adder 233 adds output signals of the transmitting timing control circuits 221, 222, . . . , 22n into a transmission signal, which is provided to a transmitting circuit 234. The transmitting circuit 234 receives a transmitting power specifying instruction from the controller 231 and transmits with the specified transmitting power. The controller 231 supplies the transmitting timing control circuits 221, 222, . . . , 22n with an instruction specifying the aforementioned basic symbol timing interval in accordance with the transmitting power specifying information that is sent to the transmitting circuit 234. That is, the controller 231 sets the basic symbol timing interval wide or narrow, depending on whether the specified transmitting power is large or small.

Figure 14:
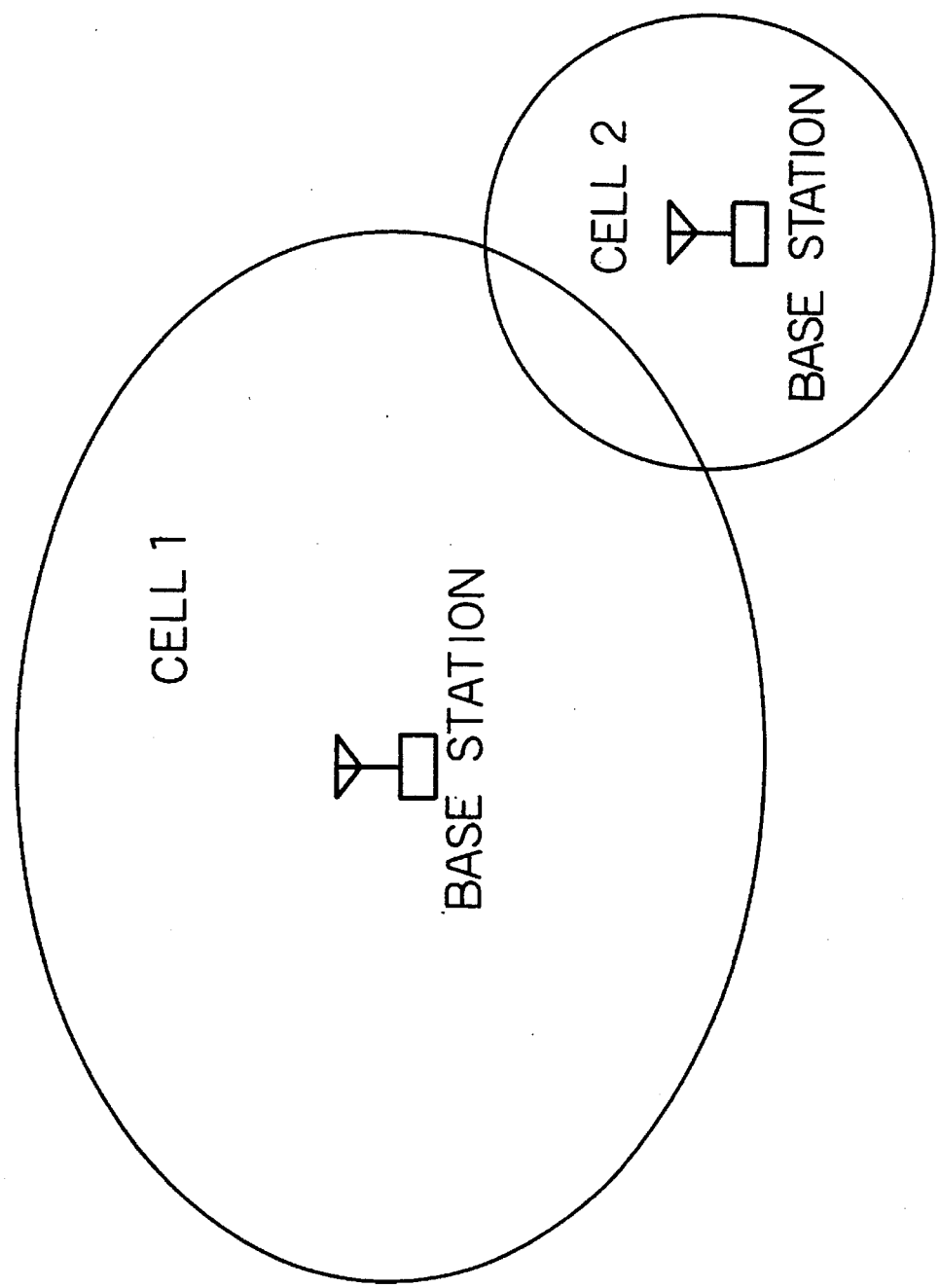
FIG. 14 is a diagram showing two cells of different sizes in a mobile communication system.

FIG. 14 shows two cells to which two base stations belong, respectively. Assume that the transmitting power in cell 1 is larger than in cell 2. A transmitting timing setting part 232 sets therein the basic symbol timing interval which is indicated to the controller 231 in accordance with the transmitting power as described above. By this, the transmitting offset interval is set in accordance with the transmitting power. In this embodiment, the base stations are assumed to be substantially identical in conditions other than the transmitting power, such as the landform of their sites, the height and directivity of their antennas and so forth. In this instance, it is expected that the service area of the cell 1 is wider than the service area of the cell 2 as shown in FIG. 14.

Next, the operation of this transmitting device will be described. The information sequences S1, S2, . . . , Sn to be transmitted are spread by the multipliers 211, 212, . . . , 21n with the same spreading code from the spreading code generator circuit 210, then delayed by the transmitting timing control circuits 221, 222, . . . , 22n for adjustment of their transmitting timing and combined by the adder 233 into a transmission signal multiplexed at the transmitting timing offset intervals corresponding to the transmitting power. The transmission signal thus produced is output from the transmitting circuit 234 and transmitted via radio channels to n mobile stations.

Figure 15:
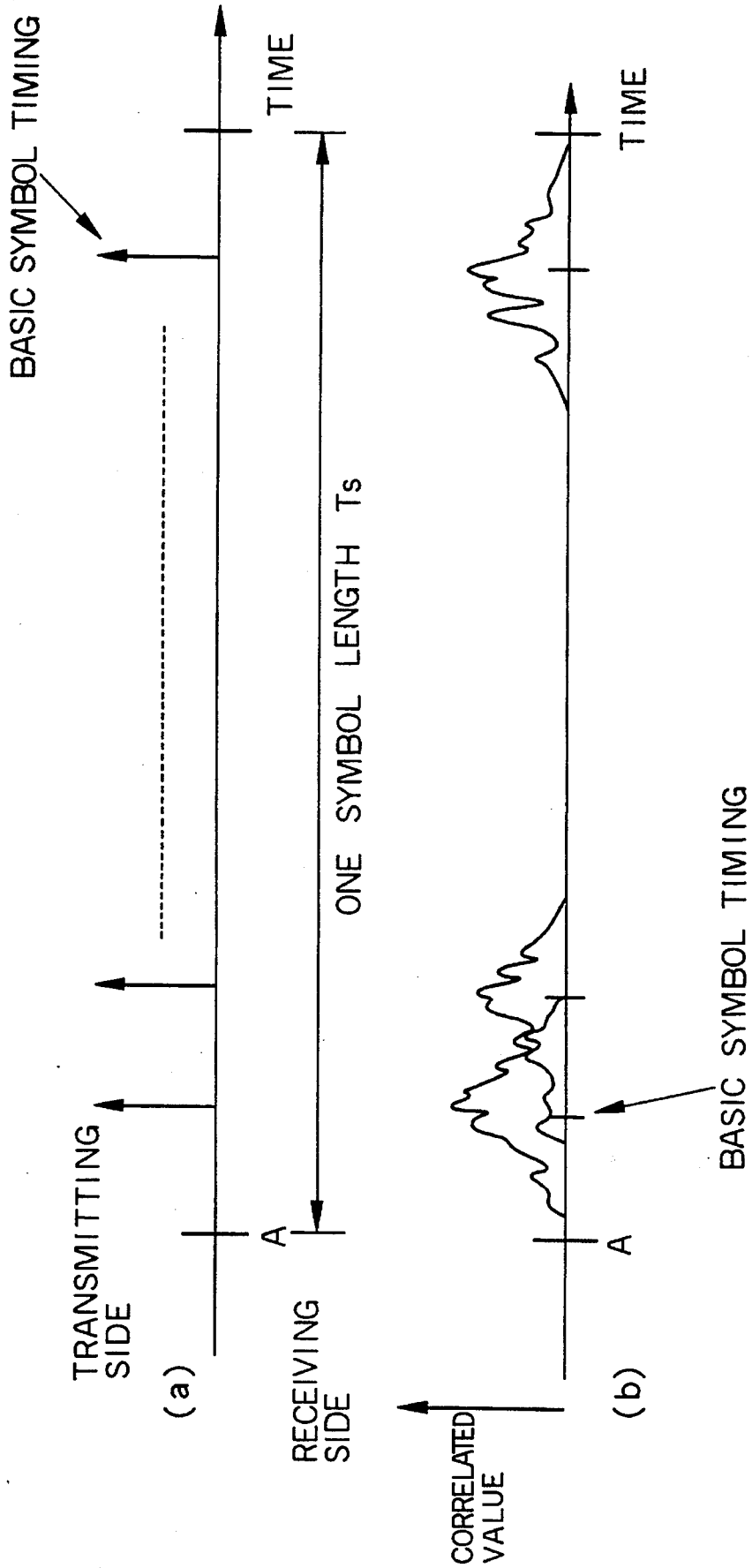
FIG. 15 is a diagram showing an example of a transmitting timing offset and the correlation output when delay profiles at the receiving side overlap.

In the mobile communication system, as the cell becomes larger, the possibility of the base station and the mobile station getting far apart increases and the mobile station is likely to receive a multipath of a large delay time. In this case, if the transmitting device of the base station performs the transmitting timing offset by the basic symbol timing offset as shown in FIG. 15(a), a delay spread abruptly increases in the mobile station having received the multipath of a large delay. Consequently, when the basic symbol timing offset interval is small, the correlated output in the receiving device of the mobile station may sometimes become such as shown in FIG. 15(b) in which delay spreads of correlated outputs at adjacent basic symbol timing points overlap, making it impossible to reconstruct the original information sequence correctly.

The present invention avoids such a problem by setting the transmitting timing offset interval in accordance with the transmitting power. FIGS. 16(a) and (b) show, by the basic symbol timing, examples of transmitting timing offset in the transmitting device of the base stations belonging to the cells 1 and 2 in this embodiment.

In the transmitting device of the base station belonging to the cell 1, as depicted in FIG. 16(a), a plurality (n) of basic symbol timing points T11–T1n are set in the period of time defined by one symbol length Ts of the information sequences S1, S2, . . . , Sn and the delays corresponding to the respective basic symbol timing points are provided by the transmitting control circuits 221, 222, . . . , 22n. Letting A represent the basic or reference time, the delays at the respective basic symbol timing points relative to the reference time A are d1 at the timing T11, d12 at T12 and d1n at T1n. The time interval between the basic symbol timing points T11, T12, . . . , T1n is set to a value substantially corresponding to the sum of the display spread and the guard time at the receiving time of the mobile station in the service area estimated from the magnitude of the transmitting power of the transmitting device of the base station.

Also in the transmitting device of the base station of the cell 2, as shown in FIG. 16(b), a plurality (n) of basic symbol timing points T21–T2n are similarly set in the period of time defined by one symbol length Ts of the information sequences S1, S2, . . . , Sn and the delays corresponding to the respective basic symbol timing points are provided by the transmitting timing control circuits 221, 222, . . . , 22n. The delays at the respective basic symbol timing points relative to the reference time A are d21 at the timing T21, d22 at T22 and d2n at T2n. The time interval between the basic symbol timing points T21, T22, . . . , T2n is set to a value substantially corresponding to the sum of the delay spread and the guard time at the receiving time of the mobile station in the service area estimated from the magnitude of the transmitting power of the transmitting device of the base station as in the case of cell 1.

As shown in FIG. 14, the service areas of the cells 1 and 2 differ in size with the transmitting powers of the base stations. In the cell 1 of the large service area in which the transmitting power of the base station is large, taking into account that the delay spread is very likely to spread over a wide area according to the place in the service area, the offset intervals (d11, d12–d11, . . . ) of the basic symbol timing points d11, d12, . . . , d1n are set larger than the offset intervals (d21, d22–d21, . . . ) of the basic symbol timing points d21, d22, . . . , d2n in the cell 2, as shown in FIGS. 16(a) and (b).

Figure 17:
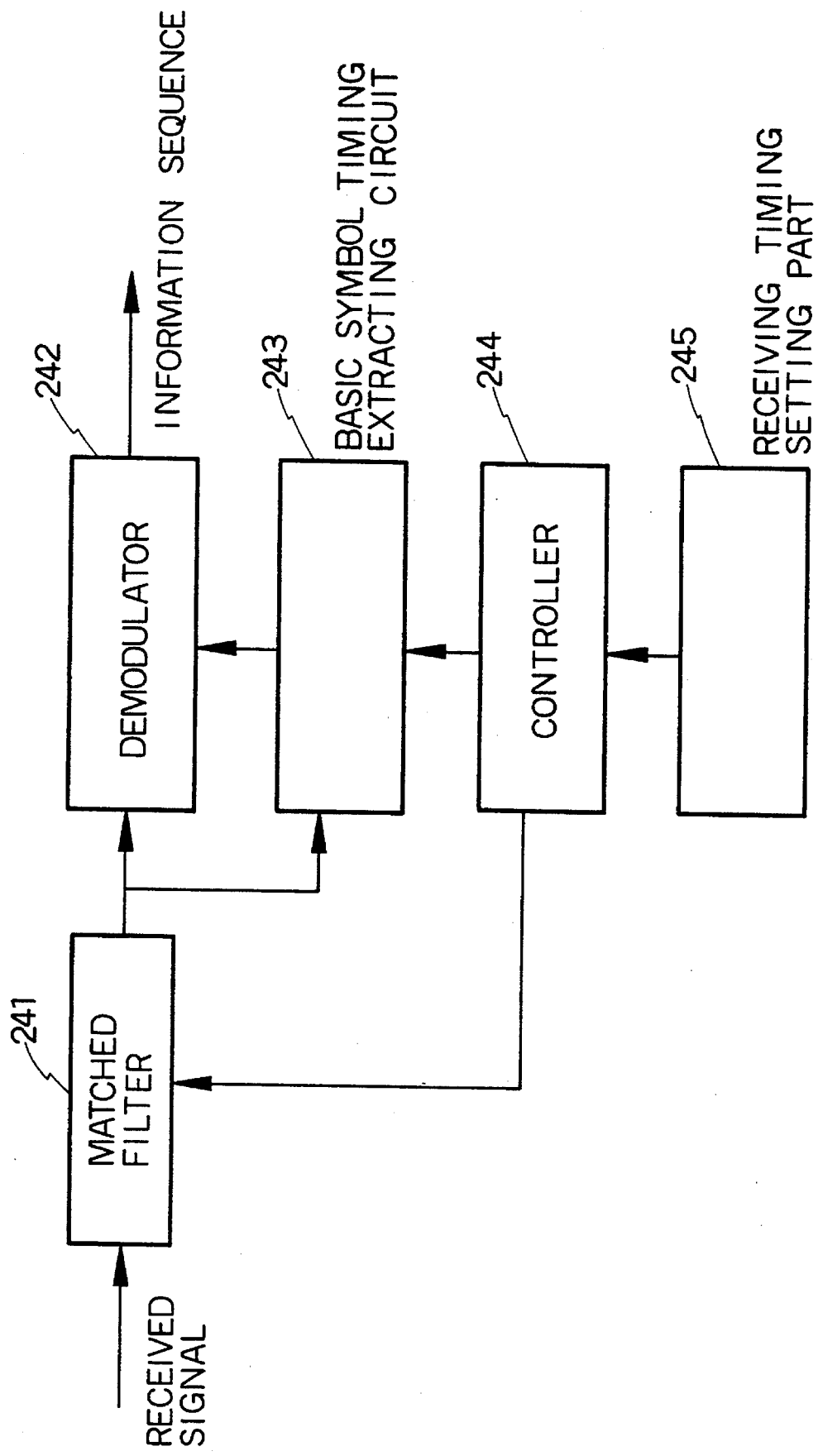
FIG. 17 is a block diagram illustrating the configuration of a receiving device provided in a mobile station in the sixth embodiment.
Figure 19:
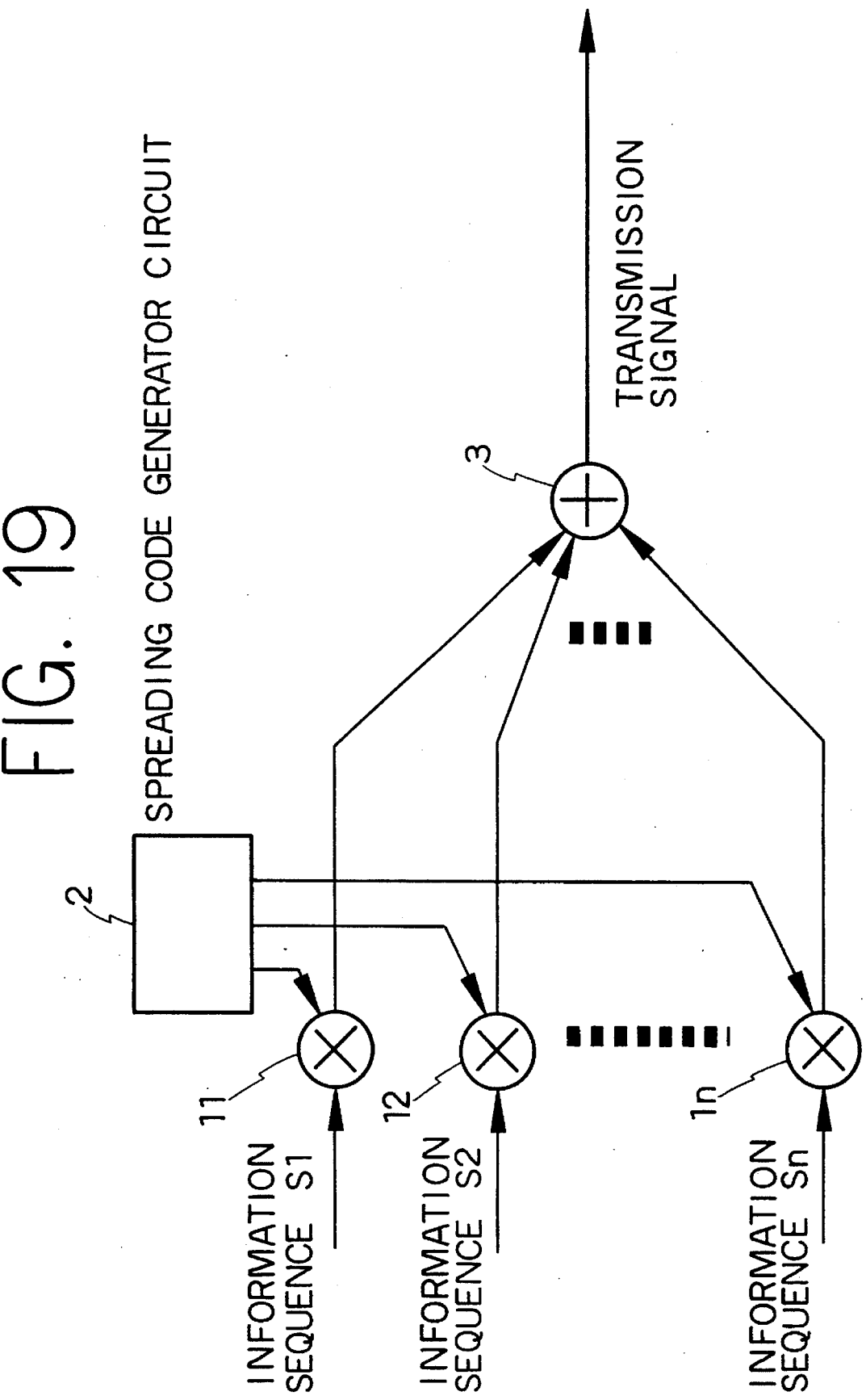
FIG. 19 is a block diagram illustrating the configuration of a transmitting device in a conventional CDMA communication system.

FIG. 17 illustrates in block form the construction of the receiving device which is provided in each mobile station to receive signals transmitted thereto from the transmitting device of FIG. 13. In this example, a matched filter is used as the correlator. The receiving device comprises a matched filter 241, a demodulator 242, a basic symbol timing extracting circuit 243 and a controller 244. The matched filter 241 detects the correlation between the spreading code supplied from the controller 244 and the received signal. The timing extracting circuit 243 extracts from the correlated output of the matched filter 241 the receiving timing of the signal transmitted to this mobile station and indicates the detected receiving timing to the demodulator 242.

The demodulator 242 reconstructs the original information sequence Si (i=1, 2, ..., n) on the basis of the output of the matched filter 241 and the output of the basic symbol timing extracting circuit 243. The RAKE demodulator is a typical demodulator and is described in detail in the aforementioned literature 2, for instance.

The controller 244 provides the spreading code to the matched filter 241 and local information to the timing extracting circuit 243 at the time of its timing extraction. A receiving timing setting part 245 sets therein the receiving timing intervals and indicates them to the controller 244.

Figure 16:
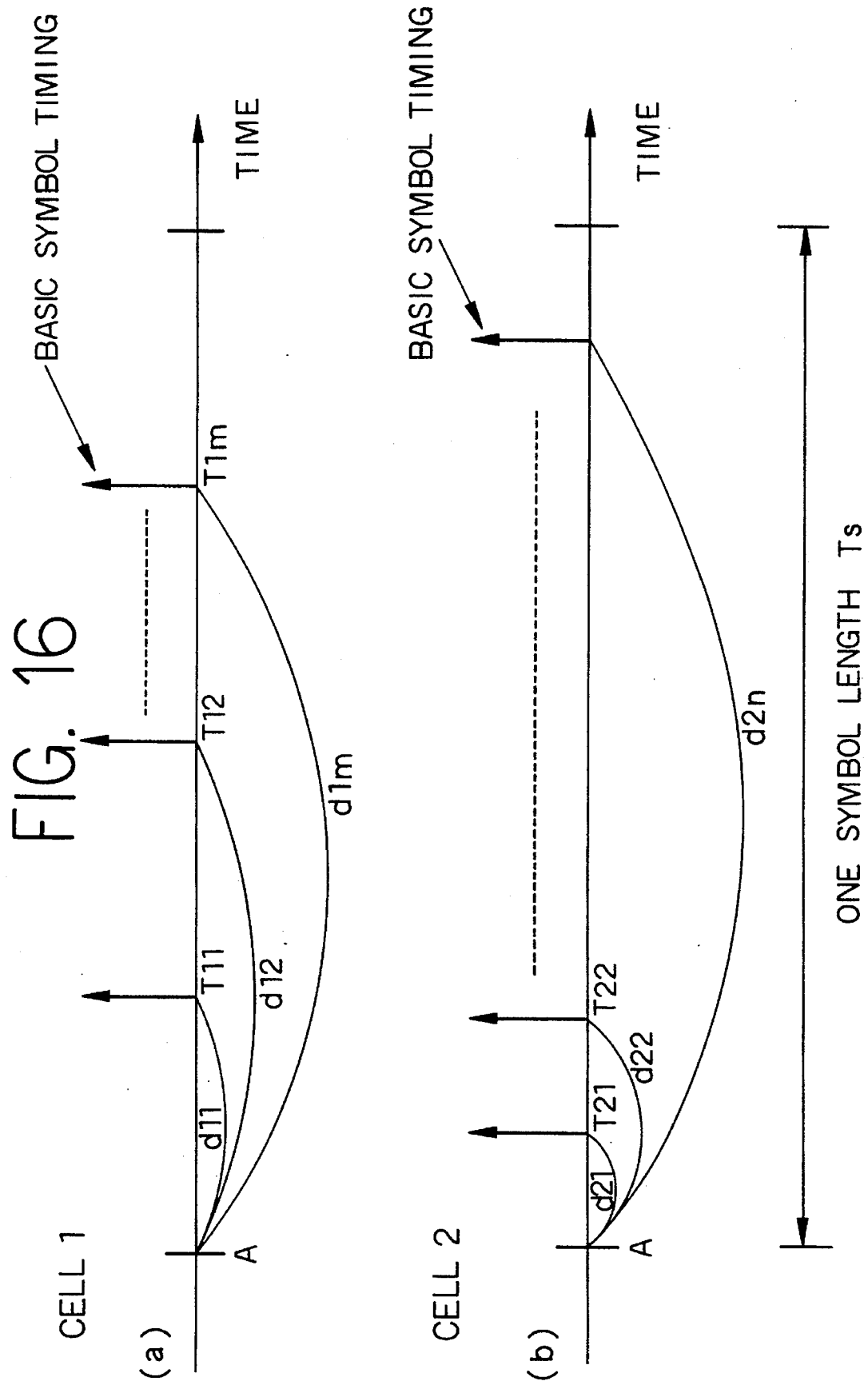
FIG. 16 is a graph showing, by way of example, transmitting timing offset in base stations of cells 1 and 2 in the sixth embodiment.

Next, the operation of this receiving device will be described. The received signal, that is, the signal transmitted from the transmitting device of FIG. 13 in the base station and received by the receiving device of FIG. 16, is fed first to the matched filter 241. The matched filter 241, which is being supplied, from the controller 244, with the same spreading code as that generated by the spreading code generator circuit 210 in the transmitting device of FIG. 13, correlates the spreading code with the received signal to despread the latter, generating a correlated output.

FIGS. 18(a) and (b) show examples of the correlated outputs of the matched filters 241 in the mobile stations belonging to the cells 1 and 2, the abscissa representing time and the ordinate the correlated value. As referred to previously, the signal received by the receiving device of FIG. 16 has been multiplexed in the transmitting timing offset; so that large correlated values are detected at the time points corresponding to the basic symbol timing points T1 through T1n in the case of the cell 1 and at the time points corresponding to the basic timing points T21 through T2n in the cell 2.

The basic symbol timing extracting circuit 243 is presupplied, from the controller 244, with information about the receiving timing of the signal transmitted to this mobile station, for instance, information about the reference time A and delays at the respective basic symbol timing points relative to the time A; the basic symbol timing extracting circuit uses this information to recognize from the output of the matched filter 241 the timing at which the transmitted signal is to be received by this mobile station. Upon detecting that this receiving timing is reached, the basic symbol timing extracting circuit 243 indicates it to the demodulator 242. The demodulator 242 reconstructs the information sequence Si transmitted to this station, from the output of the matched filter 241 at the receiving timing indicated from the basic symbol timing extracting circuit 243.

As depicted in FIG. 14, the cell 1 is larger in transmitting power than the cell 2 and hence has a wider service area, and in the cell 1 the delay spread is larger than in the cell 2; in this embodiment, the transmitting timing offset interval in the cell 1 is set larger than in the cell 2 as shown in FIG. 16. Hence, it is possible, also in the cell 1, to reconstruct the information sequence Si by capturing only that portion of the profile which is to be received from the correlated output of the matched filter 241 in the receiving device of the mobile station.

In a direct spread-code division multiple access (DS-CDMA) mobile communication system using spreading codes, even if signals are simultaneously transmitted to a plurality of mobile stations which use the same spreading code sequence, it is possible for each mobile station to reconstruct the original information sequence by capturing that portion of a profile which is to be received by the mobile station, unless the delay profiles of the transmitted signals overlap. This means that information sequences in the respective channels can independently be demodulated or decoded regardless of the transmitting timing offset multiplexing.

Hence, independent communication channels of the same number as the transmitting timing offset number n can be obtained with one spreading code by setting the transmitting offset interval (the offset interval of the basic symbol timing) in accordance with the transmitting power and performing the transmitting timing offset multiplexing so that the delay profiles of the respective information sequences do not overlap. By this, it is possible to obtain communication channels of a number n times larger than in the past by use of a limited number of spreading codes of excellent self-correlation and mutual-correlation characteristics, permitting the implementation of a CDMA mobile communication system of large channel capacity.

In the above, the transmitting power of the base station is made fixed, but in the case of effecting transmitting power control, the same results as described above could be obtained by controlling the transmitting timing offset interval within the range of the transmitting power that is controlled in the channel concerned, in accordance with the maximum transmitting power.

Incidentally, it is also possible to use, as the demodulator, the ARD demodulator described in literature 3 or 4, for instance.

As described above, the present invention provides the advantages listed below.

(1) with the system configuration in which a plurality of information sequences are spread with a common spreading code, then subjected to the transmitting timing offset multiplexing and transmitted to a plurality of mobile stations, it is possible to set up independent communication channels of the same number as the transmitting timing offset number. Consequently, even if a code sequence which includes only a limited number of spreading codes of excellent self-correlation and mutual-correlation characteristics is used, it is possible to obtain communication channels of a number multiplied by the transmitting timing offset number, permitting the implementation of a CDMA mobile communication system of large channel capacity and high flexibility of channel selection.

When a plurality of transmitting devices are provided in one base station and use different spreading codes, communications can be made at the same transmitting timing points by using the different spreading codes at the same time and communication channels of a number (the number of transmitting devices by the transmitting timing offset number) can be obtained.

Furthermore, the combined use of the transmitting timing offset multiplexing and the spatial re-use of a spreading code enables the implementation of a CDMA mobile communication system of large channel capacity and high frequency usage efficiency.

(2) With the system configuration in which information sequences are spread with a common spreading code in a plurality of base stations and transmitted to mobile stations at timing different for each base station, even if only one spreading code is used, N independent communication channels can be set up when N base stations are provided in the system. Accordingly, even if a code sequence which includes only a limited number of spreading codes of excellent self-correlation and mutual correlation characteristics is used, it is possible to obtain N-fold communication channels, permitting the implementation of a CDMA mobile communication system of large channel capacity and high flexibility of channel selection.

Moreover, since there is no need of spreading code management such as arranging specific spreading codes for use in a specific base station, the system management load is alleviated; hence, it is possible to construct a simple-structured and highly reliable system.

Furthermore, when the transmitting device of the base station uses a plurality of different spreading codes, a plurality of information sequences can be transmitted at the same timing by using the spreading codes at the same time—this provides an increased number of communication channels.

Besides, by the spatial re-use of transmitting timing where the transmitting device of two base stations spatially far apart use the same transmitting timing, the entire system is allowed to use an increased number of communication channels—this permits the implementation of a CDMA mobile communication system of large channel capacity and high frequency usage efficiency.

(3) By setting the transmitting timing offset interval in the transmitting device of the base station in accordance with the transmitting power or the cell size, that is, by setting the transmitting timing offset interval small in a base station of small transmitting power or cell size and large in a base station of large transmitting power or cell size, it is possible to avoid overlapping of delay profiles and hence ensure high-quality communication.

We claim:

1. A code division multiple access mobile communication system which uses code division multiple access for communications between a plurality of mobile stations and a base station in each of a plurality of cells wherein a plurality of different sets each of a plurality of different spreading codes are each allotted to said cells, respectively, and a same one of sets of said plurality of different spreading codes is allotted to at least two of the plurality of cells spatially far apart from each other;

the base station in each of said plurality of cells comprising a plurality of transmitting devices each of which spreads a plurality of information sequences with the same one of said spreading codes allotted to the cell to produce a plurality of spread information sequences, delays the plurality of spread information sequences by corresponding delay times, respectively, and then transmits said plurality of delayed spread information sequences, respectively, to said plurality of mobile stations; and each of said mobile stations in each cell having a receiving device which receives a signal from said base station in said cell, despreads the received signal with one of said spreading codes of one set allotted to the cell to produce a despread signal, and extracts information from said despread signal at one of said transmitting timings corresponding to the respective delay times to reproduce an information sequence.

2. The code division multiple access mobile communication system according to claim 1, wherein said plurality of delay times to be used by each of said transmitting devices are determined on the basis of the transmitting power of each said transmitting device.

3. The code division multiple access mobile communication system according to claim 1, wherein said plurality of delay times to be used by each of said transmitting devices of each base station in each cell are determined on the basis of the size of said cell constituting the coverage of said base station.

4. A code division multiple access mobile communication system which uses code division multiple access for communications between a plurality of mobile stations and a base station in each of a plurality of cells wherein a set of different spreading codes is allotted to each of the plurality of cells and a plurality of predetermined delay times corresponding to transmitting timings are each allotted to the respective cells;

said base station in each of said plurality of cells comprising a transmitting device which spreads a plurality of information sequences, respectively, with the different spreading codes of the same set to produce a plurality of spread information sequences, delays the plurality of spread information sequences by one of the delay times allotted to the cell and then transmits said plurality of the delayed spread information sequences, respectively, to said plurality of mobile stations; and each of said mobile stations in each cell having a receiving device which receives a signal from said base station in said cell, despreads the received signal with one of said different spreading codes of a set allotted to the cell to produce a despread signal, and extracts information from said despread signal at one of a plurality of different timings corresponding to one of the delay times allotted to the cell to reproduce an information sequence.

5. The code division multiple access mobile communication system according to claim 4, wherein said transmitting devices of said base stations in at least two of said cells, which are spatially far apart from each other, use the same delay time.

* * * * *